(12) United States Patent
Zhu et al.

(10) Patent No.: US 12,496,562 B2
(45) Date of Patent: Dec. 16, 2025

(54) SINUOUS MICROSTRUCTURE MIXING UNIT AND USE THEREOF

(71) Applicant: SHANGHAI VITALGEN BIOPHARMA CO., LTD., Shanghai (CN)

(72) Inventors: Xi Zhu, Shanghai (CN); Chenxi Hou, Shanghai (CN); Xiaoping Zhao, Shanghai (CN)

(73) Assignee: SHANGHAI VITALGEN BIOPHARMA CO., LTD., Shanghai (CN)

( * ) Notice: Subject to any disclaimer, the term of this patent is extended or adjusted under 35 U.S.C. 154(b) by 0 days.

(21) Appl. No.: 18/836,160

(22) PCT Filed: Feb. 8, 2023

(86) PCT No.: PCT/CN2023/074881
§ 371 (c)(1),
(2) Date: Aug. 6, 2024

(87) PCT Pub. No.: WO2023/151567
PCT Pub. Date: Aug. 17, 2023

(65) Prior Publication Data
US 2025/0128217 A1    Apr. 24, 2025

(30) Foreign Application Priority Data
Feb. 8, 2022   (CN) .................... 202210119774.0

(51) Int. Cl.
*B01F 33/301*  (2022.01)
*B01J 19/00*   (2006.01)
(Continued)

(52) U.S. Cl.
CPC ......... *B01F 33/301* (2022.01); *B01J 19/0053* (2013.01); *B01J 19/0066* (2013.01);
(Continued)

(58) Field of Classification Search
CPC ................ B01F 33/301; B01F 2101/22; B01F 25/4331; B01F 33/30; B01F 33/305;
(Continued)

(56) References Cited

U.S. PATENT DOCUMENTS 8,430,558 B1    4/2013  Yakhshi Tafti et al.
10,549,278 B2   2/2020  Toner et al.
(Continued)

FOREIGN PATENT DOCUMENTS

CN    101765762 A    6/2010
CN    102151504 A    8/2011
(Continued)

OTHER PUBLICATIONS

Supplementary European Search Report mailed May 7, 2025, in European Application No. 23 75 2347.
(Continued)

*Primary Examiner* — Minh Q Le
(74) *Attorney, Agent, or Firm* — Merchant & Gould P.C.; Daniel J. Pereira

(57) ABSTRACT

The present invention relates to a sinuous microstructure mixing unit, and also relates to a microfluidic device having the unit, and the use of the unit or the device for preparing nanoparticles, such as lipid nanoparticles or self-assembled particles.

14 Claims, 21 Drawing Sheets

(51) Int. Cl.
*A61J 3/00* (2006.01)
*B01F 25/433* (2022.01)
*B01F 33/30* (2022.01)
*B01F 101/22* (2022.01)
*B01L 3/00* (2006.01)

(52) U.S. Cl.
CPC .............. *B01J 19/0093* (2013.01); *A61J 3/00* (2013.01); *B01F 25/4331* (2022.01); *B01F 33/30* (2022.01); *B01F 33/305* (2022.01); *B01F 2101/22* (2022.01); *B01J 2219/00783* (2013.01); *B01J 2219/00833* (2013.01); *B01J 2219/0086* (2013.01); *B01J 2219/00889* (2013.01); *B01J 2219/00894* (2013.01); *B01L 3/5027* (2013.01)

(58) Field of Classification Search
CPC ................ B01J 19/0053; B01J 19/0066; B01J 19/0093; B01J 2219/00783; B01J 2219/00833; B01J 2219/0086; B01J 2219/00889; B01J 2219/00894; B01L 3/5027; A61J 3/00
USPC .......................................................... 137/806
See application file for complete search history.

(56) References Cited

U.S. PATENT DOCUMENTS

| | | | |
|---|---|---|---|
| 11,938,454 B2 | 3/2024 | Ramsay et al. | |
| 2003/0198576 A1* | 10/2003 | Coyne ................ | B01L 3/50273 436/180 |
| 2004/0184964 A1* | 9/2004 | Watanabe ........... | B01F 25/4331 422/502 |
| 2004/0262223 A1* | 12/2004 | Strook ............... | B01F 25/43172 436/178 |
| 2005/0272159 A1 | 12/2005 | Ismagilov et al. | |
| 2006/0280029 A1* | 12/2006 | Garstecki ................ | B01F 33/30 366/DIG. 2 |
| 2006/0285433 A1* | 12/2006 | Yang ................... | B01F 25/4338 366/DIG. 3 |
| 2008/0112850 A1* | 5/2008 | Higashino ........... | B01F 25/4331 422/68.1 |
| 2010/0022680 A1* | 1/2010 | Karnik ................ | A61K 9/5153 523/105 |
| 2011/0129941 A1* | 6/2011 | Kumacheva ........ | B01F 25/4331 436/180 |
| 2014/0328759 A1 | 11/2014 | Cullis et al. | |
| 2015/0131405 A1* | 5/2015 | Zhou .................... | B01F 35/7176 366/144 |
| 2016/0199840 A1* | 7/2016 | Tachibana ........... | B01F 25/4314 435/6.12 |
| 2017/0216796 A1* | 8/2017 | Sameshima ............. | B01F 33/30 |
| 2018/0311627 A1* | 11/2018 | Taher .................. | B01F 33/3035 |
| 2021/0113974 A1* | 4/2021 | Ramsay ................ | B01F 33/813 |
| 2021/0394141 A1* | 12/2021 | Chen ....................... | B01F 25/23 |
| 2022/0187174 A1* | 6/2022 | Temiz ............... | B01F 25/31422 |
| 2024/0367170 A1* | 11/2024 | Lubansky ............ | B01F 33/301 |
| 2024/0375100 A1* | 11/2024 | Ma ..................... | G01N 15/0227 |
| 2025/0000810 A1* | 1/2025 | Lee ..................... | B01F 23/4105 |

FOREIGN PATENT DOCUMENTS

| | | |
|---|---|---|
| CN | 105713834 A | 6/2016 |
| CN | 106669513 A | 5/2017 |
| CN | 107533076 A | 1/2018 |
| CN | 110918019 A | 3/2020 |
| CN | 212417987 U | 1/2021 |
| CN | 114534652 A | 5/2022 |
| JP | 2006-247534 A | 9/2006 |
| JP | 2008-526493 A | 7/2008 |
| JP | 2016-155103 A | 9/2016 |
| JP | 2018-515324 A | 6/2018 |
| WO | 2011/024738 A1 | 3/2011 |
| WO | 2018/190423 A1 | 10/2018 |

OTHER PUBLICATIONS

Translation of International Search Report mailed on Apr. 24, 2023 for International Application No. PCT/CN2023/074881 (5 pages).
Office Action issued in the corresponding Japanese Patent Application No. 2024-546444, Oct. 14, 2025 (with attached English translation).

* cited by examiner

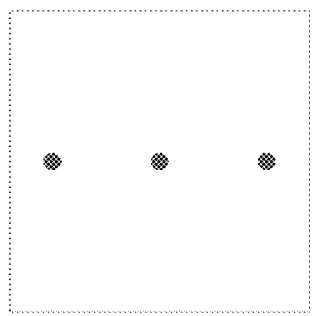 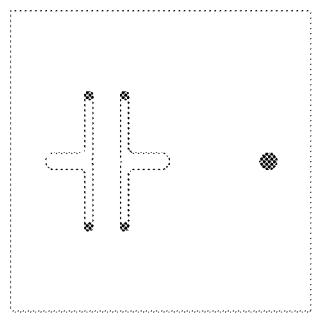 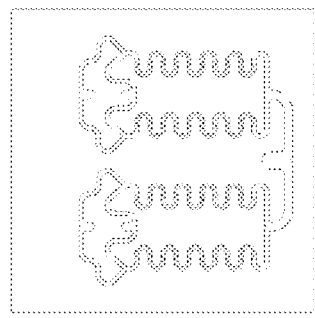
Fig. 3A  Fig. 3B  Fig. 3C
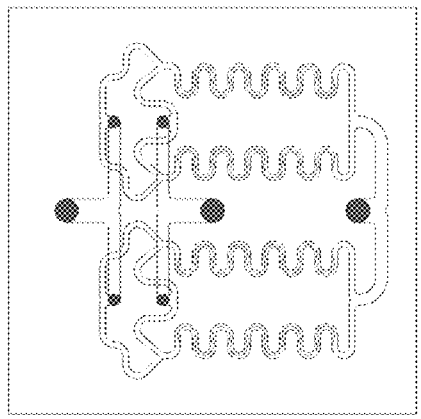 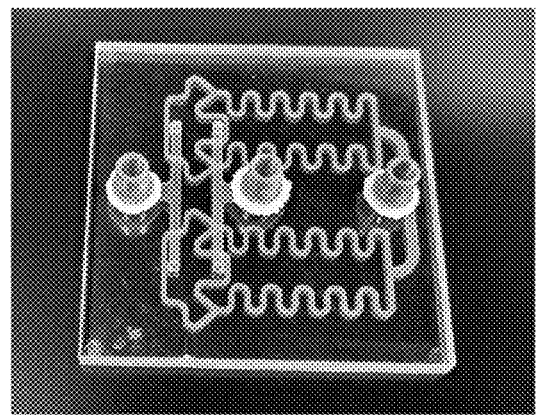
Fig. 3D  Fig. 3E $D_o$ = 2000 um
$D_i$ = 1000 um
W = 500 um
$L_c$ = 1000 um H = 250 um
$H_a$ = 125 um
$H_b$ = 125 um
W = 500 um
$W_a$ = 333 um
$W_b$ = 333 um

D-C1

First layer     Second layer     Third layer $D_o$ = 2000 um
$D_i$ = 1000 um
W = 500 um
$L_c$ = 1000 um H = 300 um
$H_a$ = 100 um
$H_b$ = 100 um
$H_c$ = 100 um
W = 500 um
$W_{narrow}$ = 250 um

T-B1

SINUOUS MICROSTRUCTURE MIXING UNIT AND USE THEREOF

CROSS REFERENCE TO RELATED APPLICATIONS

This application is a National Stage Application of International Application No. PCT/CN2023/074881 filed on Feb. 8, 2023, which claims benefit of Ser. No. 202210119774.0 filed on Feb. 8, 2022 in China, and which applications are incorporated herein by reference. To the extent appropriate, a claim of priority is made to each of the above disclosed applications.

TECHNICAL FIELD

The present invention relates to the field of microfluidics, in particular to a sinuous multi-layer microstructure mixing unit and a mixing device having the mixing unit. The present invention further relates to the use of the mixing unit and the mixing device in the preparation of nanoparticles, such as lipid nanoparticles loaded with nucleic acid molecules. The mixing unit and mixing device of the present invention are particularly suitable for self-assembly for preparing lipid nanoparticles used as drugs.

BACKGROUND ART

Microfluidic technology has been applied to the preparation of nano-sized delivery vehicles, especially drug delivery vehicles, such as LNPs, polymer nanoparticles, and liposomes.

Lipid nanoparticles (LNPs) are nanoparticles formed by using lipids. At present, the technology of encapsulating nucleic acids such as mRNAs with lipid nanoparticles has been used for the preparation of nucleic acid drugs and gene therapies. LNP technology, as a revolutionary delivery technology, solves the problem of nucleic acid delivery and makes it possible to realize mRNA vaccine. As typical organic nanoparticles, LNP delivery systems have the advantages of a strong permeability, a high nucleic acid load, a low toxicity, a good long-term stability, a good biocompatibility, etc., as compared with virus delivery systems.

During the production of nanoparticles such as LNPs, nano-sized particles are formed by mixing, for example, an ethanol phase with an aqueous phase, followed by supersaturation of lipid or polymer molecules caused by a rapid mixing process, causing self-assembly of the nanoparticles.

In this process, the rapid mixing of the two solutions is the key to limit the particle size to <100 nm, without the need for top-down size reduction methods used in other traditional preparation processes such as extrusion and ultrasonication.

Since nanoparticles are formed by self-assembly, these production methods are considered as bottom-up methods. Compared with the traditional top-down methods, the main advantages of the rapid mixing process are enhanced control of physical and chemical properties, improved encapsulation efficiency and improved feasibility of process scale-up.

Although different microstructure mixing devices have different 3D structures, they can all induce the rapid mixing of an organic phase with an aqueous phase in a controlled environment. The principle of all these devices is that through the rapid mixing of two miscible phases, the polarity of the solvent environment of materials such as lipids or polymers increases rapidly, thereby forming lipid or polymer nanoparticles.

Taking the preparation of lipid nanoparticles (LNPs) delivering mRNAs as an example, a method for rapidly mixing an ethanol phase containing a hydrophobic lipid with a buffer aqueous phase containing mRNAs by means of a microfluidic chip or T-tube mixer is generally used during mixing. During this process, the formation of LNPs is achieved under the driving by a hydrophobic interaction force, and the encapsulation of mRNAs is completed under the driving by an electrostatic force.

In a typical process for preparing lipid nanoparticles loaded with mRNAs, four lipid materials (ionizable lipid, distearoyl phosphatidylcholine (DSPC), cholesterol, and PEGylated lipid) are dissolved in an ethanol solution, and at this time, the ionizable lipid remains non-ionized and presents electric neutrality. Generally, an ethanol solution containing a lipid is mixed with a weakly acidic buffer containing mRNAs (pH=3-5.5).

When coming into contact with the aqueous buffer, the lipid becomes insoluble, while the ionizable lipids are ionized and positively charged. Next, the positive charge of the ionizable lipid drives the ionizable lipid to generate electrostatic interaction with the negative charge of the phosphate skeleton of the mRNA. Thus, the lipid material completes self-assembly in the supersaturated state, forming lipid nanoparticles loaded with mRNAs.

The key of the mixing technology in the preparation of LNPs is to make the ethanol phase and the aqueous phase form a turbulent flow (or referred to as chaotic flow or chaotic flow) during mixing. At a relatively low flow rate or a relatively low Reynolds number, the solution in the fluid channel generally forms a laminar flow, and the mixing at this time is diffusion mixing, which is a relatively slow process. During diffusion mixing, the degree of mixing depends on the length of the channel and the contact surface area between the two phases. If the ethanol phase and the aqueous phase are brought into contact and mixed in a laminar flow manner, a phospholipid bilayer will be formed at the interface, and finally, a structure similar to liposomes or multi-layer vesicles will be formed, which will affect the yield and uniformity of particles. However, under turbulent flow condition, the lipid material quickly becomes in a supersaturated state and can self-assemble to form a uniform solid structure. At a relatively high Reynolds number (Re) or a relatively high flow rate, the turbulent flow improves the mixing efficiency and also makes the mixing time shorter, and a shorter mixing time reduces the mass transfer effect. The mass transfer effect leads to lipid aggregation and high heterogeneity of particles. During the preparation of LNPs, the mixing flow path has a relatively low mixing rate and Reynolds number, so how to form a turbulent flow has become difficult under such conditions. When the progression of the self-assembly of LNPs is based on the dilution of the ethanol phase into the aqueous phase, the solvent polarity increases, resulting in the formation of a lipid precipitate.

U.S. Pat. No. 10,843,194 B2 discloses a flow path structure similar to the shape of a herringbone, which is referred to as a staggered herringbone mixer (SHM). The structure has uncertainty when it is scaled-up from laboratory level to industrial level, and it may be difficult to apply it to the industrial level.

Hirota et al. first reported the application of T-tube mixing in the preparation of a lipid material drug delivery system in 1999. As a method for producing a DNA-lipid complex, T-tube mixing provides an alternative to the macro-mixing method. As the name implies, a T-tube is a three-way T-shaped tube, by which a material flows in horizontally from both ends of the horizontal stroke of the letter "T"

shape and out vertically from the vertical stroke of the letter "T" shape. Compared with macroscopic mixing methods (such as vortexing or dripping), the T-shaped joint mixer provides a relatively controllable mixing environment, thereby reproducibly producing nanoparticles. When two input flows in the T-shaped joint collide, rapid mixing occurs, causing the output flow to form a turbulent or chaotic flow.

T-tube mixing is one of the preferred methods for large-scaled LNP production by mRNA vaccine companies. However, in the early stage of drug development, the application of the T-tube mixing method in laboratory-scale small batch production is very limited. The main reason for the limited application is that the T-shaped structure is relatively simple, so a relatively high flow rate is required to ensure effective mixing. A high flow rate generally corresponds to a relatively large amount of a material, because the material flows through the equipment more quickly. However, for nucleic acid drugs, the cost of raw materials is high, and the amount needed for the product is small, which is not suitable for the case of meeting a high flow rate with a high amount. For example, when the flow rate is 60 mL/min, at least about 20 mL of a liquid is needed if the production is only carried out for 20 s at the shortest. Taking the mRNA as an example, such a volume contains RNA molecules at the mg level; however, cytology and other research may only need RNAs at the ug level, which causes very high costs and waste.

In 2002, Stroock et al. found that the addition of a herringbone structure to the flow path could improve the mixing effect at a low Reynolds number, thus ensuring millisecond-level rapid mixing at a relatively low flow rate. Pieter Cullis' team took the lead in using a staggered herringbone mixer (SHM) to produce LNPs by chaotic convection mixing. This technology was subsequently commercialized by Precision Nanosystems. This method was developed to enhance the control of the mixing process and shorten the mixing time. Although SHM has been widely used in research laboratories, such a mixer has large processing difficulties and limited performance. The SHM design has difficulty in scaling up and process amplification, so it is limited in clinical transformation and large-scale applications.

CN 108778477 A discloses a bifurcated mixer using Dean vortexing, which comprises a plurality of annuli arranged in series.

It is still desirable to design an improved microfluidic mixing device, which can improve the mixing efficiency, reduce the production cost, and can be widely applied to drug production in the field of medicine, especially the production of nanoparticles by self-assembly.

SUMMARY OF THE INVENTION

In a simple curved or spiral design, rapid mixing of fluids can be achieved by means of an extremely high flow rate. The extremely high flow rate can induce the formation of secondary Dean vortexing, thus turning the fluid into a chaotic convection state. This situation generally corresponds to an extremely high Reynolds number, which is not applicable in many practical scenarios.

The sinuous multi-layer microstructure mixing unit of the present invention helps to generate more flows and induce chaotic convection by designing each layer of flow path to be in a geometric shape that alternately bends in different directions and combining more than one layer of such flow paths. Therefore, the sinuous microstructure mixing unit of the present invention can induce more intense chaotic convection during the production of self-assembled lipid or polymer nanoparticles, allowing two fluids to surround and effectively wrap each other, leading to exponential amplification of the interface between the fluids and ensuring rapid mixing of the fluids.

Specifically, the sinuous microstructure of the present invention is a sinuous multi-layer microstructure, in which each layer has the same or different width, and the projection shapes of two adjacent layers do not completely but always overlap throughout the whole flow path. It can also be regarded that one or more flow restricting ribs are arranged along the flow path, the cross section of which is originally rectangular, so that the cross section of at least part of the flow path has one or more depressions relative to the original rectangle, especially the cross section of the curved part of the sinuous structure is no longer rectangular. This design can further promote the generation of vortex and improve the mixing effect. Based on such designs, the present invention is completed.

In a first aspect, the present invention provides a sinuous multi-layer (SML) microstructure mixing unit comprising two or more layers of sinuous flow paths, wherein the projection shapes of two adjacent layers always but not completely overlap throughout whole the flow path. Preferably, the projection shapes of two adjacent layers always only partially overlap in the semi-circular ring or semi-elliptical ring part of the sinuous form.

In a second aspect, the present invention further provides a microfluidic device comprising the sinuous microstructure mixing unit or the sinuous multi-layer microstructure mixing unit of the above first aspect. In the device, the sinuous microstructure mixing units or sinuous multi-layer microstructure mixing units are combined in parallel and/or series.

In a third aspect, the present invention relates to a method for preparing self-assembled nanoparticles by means of the microstructure mixing unit of the first aspect or the device of the second aspect. In a specific embodiment, the self-assembled nanoparticles are lipid nanoparticles loaded with nucleic acids.

The advantages of the present invention lie in at least the following aspects.

The microstructure mixing unit of the present invention can enable liquids to form a turbulent flow during mixing at a relatively low mixing rate (such as total flow rate) and Reynolds number (Re), and the intensity of mixing is increased. Multiple layers of sinuous flow paths with different widths or multiple layers of staggered sinuous flow paths make the relative direction of the fluid flows in the different layers change repeatedly, which causes the main rotation center of Dean vortexing to move between mixing units.

The combination of sinuous microstructure mixing units in the device of the present invention can provide a precise liquid pressure distribution. By using a curved or spiral design, the microstructure mixing unit of the present invention provides a method for promoting convection transmission in microchannels by means of the simple geometric design.

The sinuous microstructure mixing unit of the present invention can still maintain excellent mixing effects in the case of proportional enlargement (e.g., proportional enlargement of the cross section and length of the flow path) or scale-up (e.g., by connecting a plurality of mixing units in parallel), so that the applicable scenes of the mixing unit are more diversified.

The sinuous microstructure mixing unit of the present invention and the microfluidic chip comprising the unit are particularly suitable for the preparation of nanoparticles, especially for the self-assembly of nanoparticles loaded with drug molecules, such as the self-assembly of lipid nanoparticles loaded with nucleic acid molecules.

The sinuous multi-layer microstructure mixing unit of the present invention can realize millisecond-level mixing and form nanoparticles, and the effect is similar to that of a herringbone SHM mixer. While achieving this effect, there is no need to have a complex 3D surface structure, e.g., a ridge structure in the staggered herringbone mixer. In view of the fact that the complex 3D surface structure may induce a high local shear force, the flow channel formed by the unit of the present invention is more suitable for production processes involving biological macromolecules (especially nucleic acid molecules). In addition, there is no complex 3D surface structure, which makes such a mixing device (such as chips) easy to clean and reusable.

BRIEF DESCRIPTION OF THE DRAWINGS

FIGS. 3A-3E show a mixing device in which 4 sinuous multi-layer microstructure mixing units are connected in parallel. FIG. 3A is a schematic view of an inlet layer as a first layer. FIG. 3B is a schematic view of a shunt layer as a second layer. FIG. 3C is a schematic view of a mixing layer as a third layer. FIG. 3D is a perspective view of the superposition of all the layers, and FIG. 3E is a photo of the real object.

FIG. 5A is double-layer structure D-A1, in which the inner edge of a narrow flow path layer always overlaps with the inner edge of a wide flow path layer in the semi-circular ring part; FIG. 5B is double-layer structure D-B1, in which the outer edge of a narrow flow path layer always overlaps with the outer edge of a wide flow path layer in a semi-circular ring part; FIG. 5C is double-layer structure D-C1 with the same width, in which double layers of flow paths are staggered in width in the semi-circular ring part, forming a cross section similar to the Z shape in Tetris; FIG. 5D and is three-layer structure T-B1. The figures show the dimensions of each layer, with the symbols of the following meanings: W: width; H: height; Lc: the length of the straight flow path; Do: the outer diameter of the semi-circular ring in the projection shape; and Di: the inner diameter of the semi-circular ring in the projection shape.

FIG. 8A is a schematic diagram of Y-shaped mixing unit and Y2. In FIG. 8A and FIG. 8B, the panel on the left is a cross-sectional view of a flow path of a mixing part.

DETAILED DESCRIPTION OF EMBODIMENTS

Figure 1:
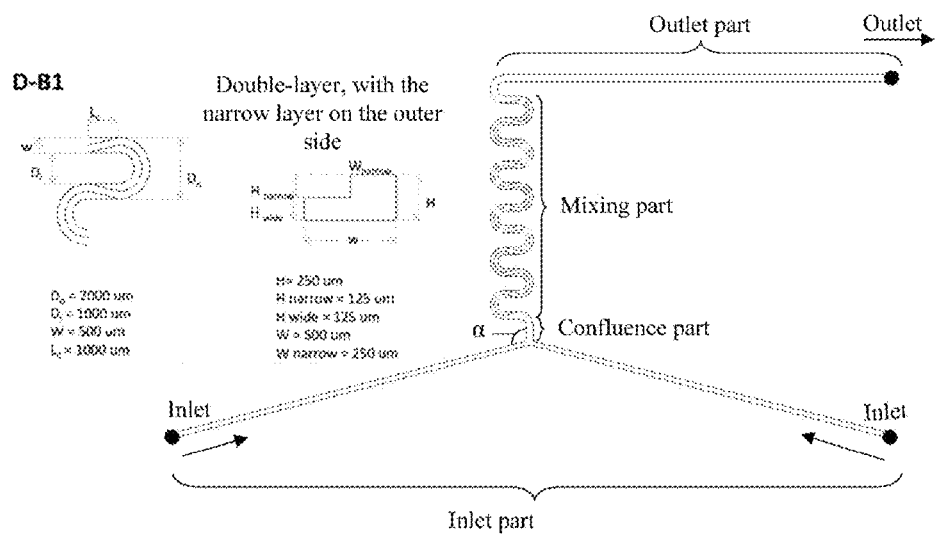
FIG. 1 is a schematic diagram of sinuous microstructure mixing unit D-B1. The two panels on the left are respectively a top view of a repeating unit of a sinuous flow path in the mixing part (upper panel; comprising two semi-circular rings and two short straight flow paths) and a cross-sectional view of this flow path (lower panel).
Figure 2:
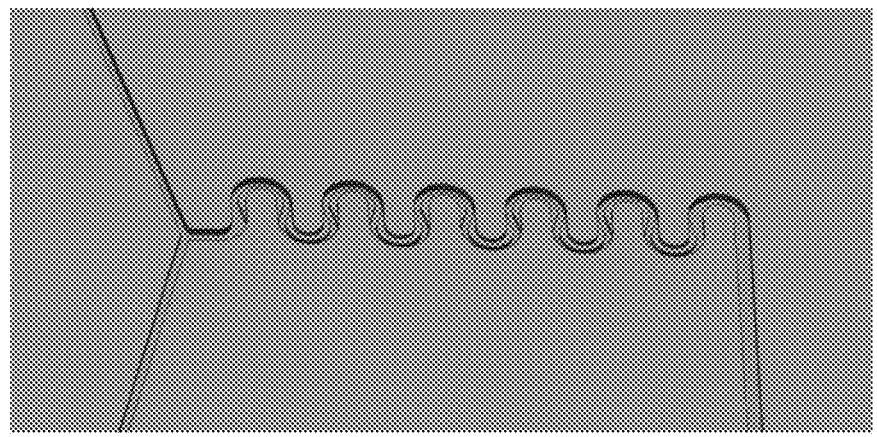
FIG. 2 is a 3D schematic diagram of sinuous microstructure mixing unit D-B1.
Figure 4A:
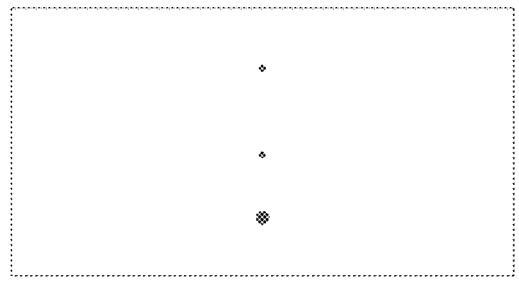
FIGS. 4A-F show a mixing device in which 16 sinuous multi-layer microstructure mixing units are connected in parallel. (A) is a schematic view of an inlet layer as a first layer, (B) is a schematic view of a shunt layer as a second layer, (C) is a schematic view of a mixing layer as a third layer, (D) is a perspective view of the superposition of all the layers, and (E and F) are images of the real objects.
Figure 4B:
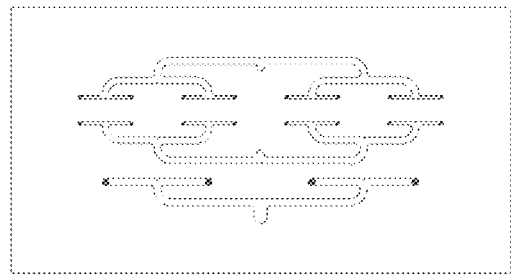
Figure 4C:
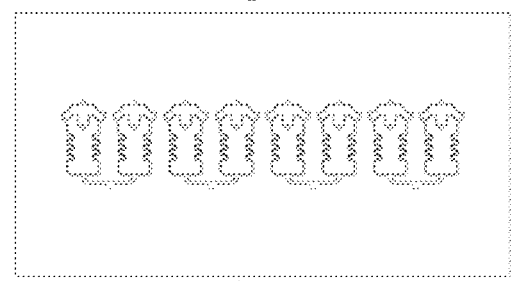
Figure 4D:
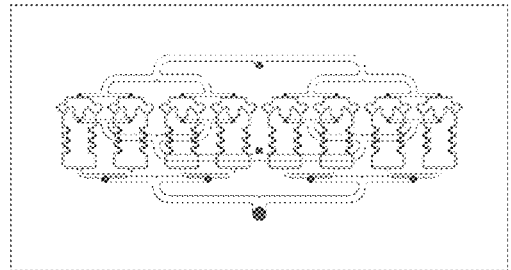
Figure 4:
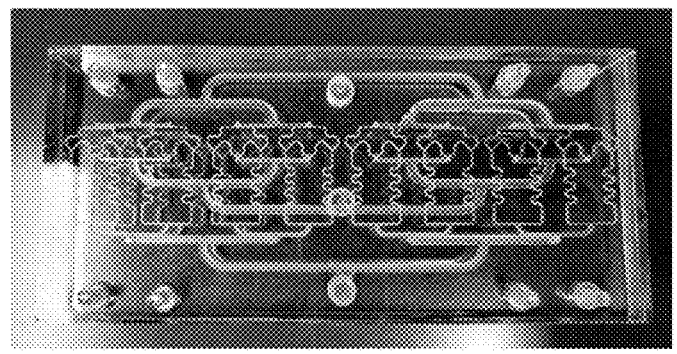
Figure 4:
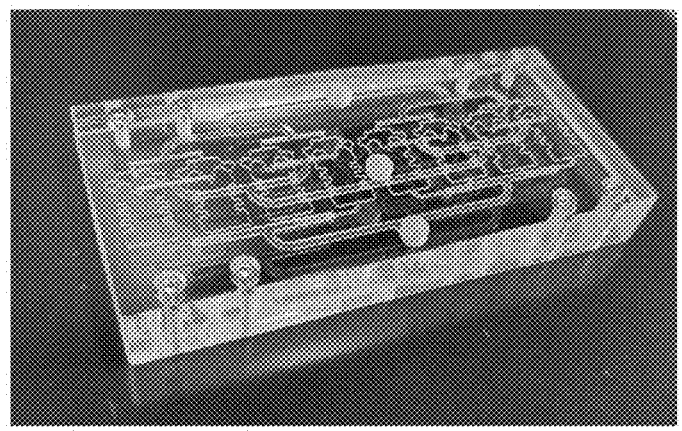

The terms used in the present application are defined hereinbelow. The undefined terms should be interpreted as commonly understood by those skilled in the related art.

Definitions

The term "microstructure mixing unit" in the context of the present invention refers to a device for mixing fluids with submillimeter structures in a certain dimension. Specifically, the microstructure mixing unit is a part of a microfluidic chip or the microfluidic chip itself.

The term "flow path" or "flow channel" has the same meaning in the context of the present invention and refers to a cavity in a microfluidic chip through which a fluid can pass, which is generally an elongated channel. The flow path in a microfluidic chip in the prior art generally has a rectangular cross section. The cross section of the flow path of the present invention is preferably not rectangular over the entire length. The flow path of the present invention can be regarded as a combination of several layers of flow paths with rectangular cross sections arranged from top to bottom. Therefore, reference to "multi-layer flow path" is only to describe the structure of the mixing unit of the present invention more clearly, but it does not mean that the fluids in these flow paths are physically isolated from each other to form multiple layers of channels independent of each other. In fact, the "multi-layer flow path" will eventually form a single fluid flow channel.

The term "sinuous" flow path refers to a flow path which is composed of a plurality of arcs connected in a head-to-tail manner and alternately bent in opposite directions and the whole flow path of which is in a wavy shape. In a specific embodiment of the present invention, the arc is a semi-circular ring or a semi-elliptical ring. Since the bending directions of two adjacent semi-circular rings or semi-elliptical rings are opposite, two consecutive semi-circular rings or semi-elliptical rings can be regarded as a "repeating structure" or "repeating unit" when each semi-circular ring or semi-elliptical ring has the same size. The fluctuation direction of the "sinuous form" is similar to the vibration direction of a wave in physics. The extension direction of the "sinuous form" is similar to the propagation direction of a wave in physics. Therefore, the fluctuation direction of the sinuous form and the extension direction of the sinuous form are two directions perpendicular to each other.

The term "cross section" refers to a cross section perpendicular to the flow direction of a liquid in a flow path.

The term "projection shape" refers to a shape observed from above when the whole microfluidic chip or sinuous microstructure mixing unit is placed horizontally. The coincidence of "projection shapes" refers to complete coincidence in size and shape and does not include the case where one projection shape falls into another projection shape because it is smaller.

The term "fluid communication" or "have the potential for fluid communication" refers to the connection relationship between various structures, components or elements so that a fluid can flow from one to another.

The term "in parallel" means that two elements or components are connected in a head-to-head and tail-to-tail manner. In the context of the present invention, the term "in parallel" generally refers to the connection of two or more mixing units in parallel, that is, these mixing units are connected at an inflow end through a confluence part or share one confluence part, and outlet ends are connected through the same outlet part or share one outlet part.

Unless otherwise specified, the term "flow rate" in the context of the present invention represents the total input flow rate (total flow rate; TFR). TFR refers to the sum of the rates at which the fluids to be mixed are pumped through inlets, e.g., the sum of the rates at which a fluid containing a lipid and a fluid containing nucleic acid molecules, which are to be mixed, pass through two inlets. TFR is generally expressed in mL/min. For convenience of expression, in the context of the present invention, an ultra-low flow rate is considered as a flow rate of <1 ml/min, a low flow rate is a flow rate of >1 ml/min and <4 ml/min, a medium flow rate refers to a flow rate of >4 ml/min and <12 ml/min, and a high flow rate refers to a flow rate in the range of >12 ml/min.

The term "Dean vortexing" means that when a fluid flows through a curved channel, the fluid that goes towards the center of the channel is pushed outward (caused by no-slip boundary condition) due to the centripetal force and the high velocity of the fluid at this position. The action of these forces causes the fluid to rotate perpendicularly to the channel.

The term "Reynolds number", which is a dimensionless number representing the flow state of a fluid, is the ratio of the inertial force to the viscous force in the fluid. A laminar flow occurs at a relatively low Reynolds number, and a turbulent flow occurs at a relatively high Reynolds number.

The term "nanoparticle" refers to a particulate matter with a diameter at the submicron level, generally less than 100 nm in diameter. In the context of the present invention, the term nanoparticle generally refers to a nanovehicle loaded with a molecule as a pharmaceutically active component.

The term "LNP", the abbreviation of lipid nanoparticle, refers to a lipid nanoparticle.

The term "vehicle material" in the context of the present application refers to a main material that forms a nanoparticle, which is generally a biocompatible component and can independently form a nanoparticle. In the present invention, the "vehicle material" generally does not have the desired pharmaceutical activity such as therapeutic activity.

The term "load" in the context of the present application refers to a substance that can be delivered by a vehicle material and has pharmaceutical activity such as therapeutic activity.

The term "nucleic acid" refers to any polymerized form of nucleotides, including deoxyribonucleotides or ribonucleotides, or analogues thereof. The term "nucleic acid" can be used interchangeably with the terms "polynucleotide" and "oligonucleotide". The nucleic acid may be in a single-stranded, double-stranded or multi-stranded form. The polynucleotide may be a DNA. The polynucleotide may be an RNA.

The term "particle size" in this context refers to the diameter of a spheroidal particulate matter. The particle size of submicron-scaled particles is generally measured by dynamic light scattering (DLS). DLS uses laser to irradiate submicron-scaled particles and cause scattering, and then analyzes the fluctuation change of the scattered light, thus deducing the particle size distribution of the particles. The measurement results can include volumetric particle size, strength particle size and number particle size, as well as the average particle size calculated based on these three parameters. Unless otherwise specified, reference to "particle size" in the context of the present invention means the volumetric particle size measured by dynamic light scattering.

The term "PDI", the abbreviation of polydispersity index, refers to polydispersity coefficient, a parameter of the particle size distribution width of nanoparticles. The larger the coefficient, the wider the distribution and the greater the polydispersity. The smaller the coefficient, the narrower the distribution and the better the uniformity.

Sinuous Multi-Layer (SML) Microstructure Mixing Unit

Self-assembly of nanoparticles generally requires a turbulent flow. At a relatively low Reynolds number, the typical flow characteristic is laminar flow without turbulent flow. Therefore, for microstructure mixing units (such as microfluidic chips) used for self-assembly of nanoparticles, the Reynolds number and turbulent flow formation are improved by increasing the flow rate, or turbulent flow at a low flow rate/Reynolds number is achieved by means of a special flow rate design.

Figure 24:
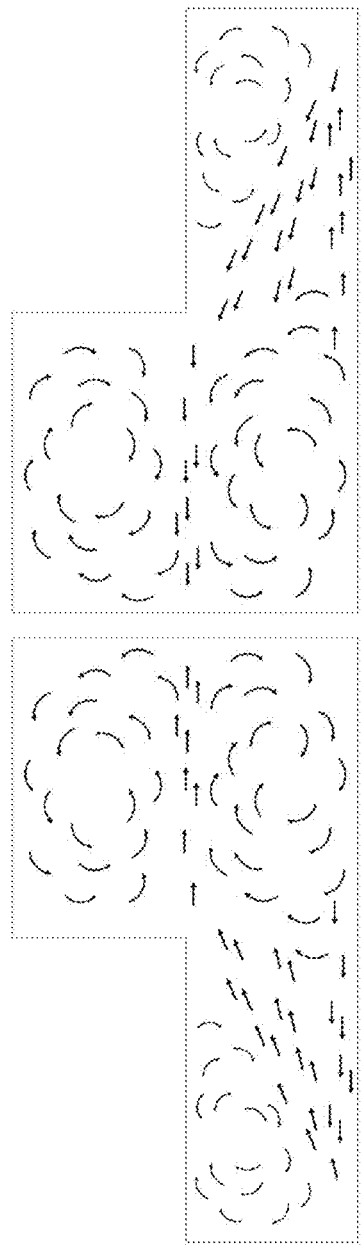
FIG. 24 is a schematic diagram of the turbulent flow direction in a two-layer mixing unit such as D-B1.

In the present invention, a sinuous flow path composed of semi-circular rings or semi-elliptical rings which alternately appear and bend in different directions is used, and the mixing part comprises multiple layers of such sinuous flow paths, so that the mixing of components in the fluid is enhanced by inducing staggered flow and chaotic convection in the mixer (see, for example, FIG. 24). By using a curved or spiral design, a method for promoting convection transmission in microchannels by means of the simple geometric design is provided, wherein Dean vortexing is produced during mixing, thus improving the mixing effect.

The present invention provides a sinuous multi-layer microstructure mixing unit, comprising an inlet part, a confluence part, a multi-layer mixing part, and an outlet part in fluid communication, wherein each layer in the multi-layer mixing part is a sinuous flow path, and the sinuous flow path comprises n number of semi-circular rings or semi-elliptical rings, and any two adjacent semi-circular rings or semi-elliptical rings have opposite bending directions and are connected to each other via a straight flow path; projection shapes of two adjacent layers in the multi-layer mixing part always at least partially but not completely coincide throughout the flow path of the mixing part; and the inlet part comprises at least two inlets, and the inlets are in fluid communication with the confluence part, so that different fluids flowing in from the inlets converge at the confluence part.

The inlet part is used for allowing different fluids to be mixed to flow in and therefore comprises at least two inlets, for example, two inlets. For example, in the case of preparing liposome nanoparticles loaded with nucleic acids, at least one inlet is an inlet for a fluid containing a lipid to enter, and at least one other inlet is an inlet for a fluid containing a nucleic acid to enter.

After the different fluids flow in through the inlets, it is preferable to flow through a length of flow path before converging. Therefore, in a preferred embodiment, the inlet part comprises a length of flow path between each inlet and the confluence part. In a preferred embodiment, the length of the flow path between the inlet part and the confluence part is at least 2000 μm. In a specific embodiment, the flow path between the inlet and the confluence part is a straight flow path.

After passing through the inlet part, different liquids flowing in from different inlets converge at the confluence part. The confluence part can be of any length. The length and shape of the confluence part can be adjusted according to the requirements of chip manufacturing and flow path design.

In some embodiments, the mixing unit of the present invention does not comprise a confluence part. Where no confluence part was comprised, the fluids flowing in from different inlets converge directly in the mixing part.

The fluids flowing in from different inlets can converge into the confluence part at the same position. In this case, taking a solution of two inlets as an example, the inlet part and the confluence part can form a T-shaped or Y-shaped structure, wherein the confluence part is a vertical part of the letter T or Y shape, and the flow path of the inlet part is two forked branches above. In a preferred embodiment, the included angle α between the straight flow path of the inlet part and the straight flow path of the confluence part is greater than or equal to 90° and less than 180°.

After passing through the confluence part, the different fluids are roughly mixed together. Subsequently, the fluid mixture enters the mixing part, and turbulent flow will be formed through the special structure of the mixing part, so as to fully mix and promote the formation of the desired product such as self-assembled nanoparticles.

In a specific embodiment, the straight flow path of the confluence part is perpendicular to or consistent with the fluctuation direction of the sinuous flow path of the mixing part. In a specific embodiment, the straight flow path of the confluence part is perpendicular to or consistent with the extension direction of the sinuous flow path of the mixing part.

The multi-layer mixing unit is implemented in many forms, and its main purpose is to generate more turbulent flows under the same conditions by forming a more complicated flow path structure than a customary flow path with a simple rectangular cross section.

Therefore, the sinuous multi-layer microstructure mixing unit can result in a better mixing effect. Specifically, even at a not sufficiently high flow rate and Reynolds number, the fluid can form a turbulent flow.

For example, the multi-layer mixing unit may comprise 2-20 layers. Considering the production process and cost, it is preferable not to exceed 5 layers, e.g., it has 2 layers, 3 layers, 4 layers and 5 layers. But considering the future development of production technology, more layers are also possible.

The width of each layer of flow path in the multi-layer mixing unit can be the same or different. For example, these layers may have one or more widths. The only requirement is that the projection shapes of two adjacent layers do not completely coincide. Incomplete coincidence of the projection shapes can be achieved either by different widths or by staggered arrangement of two layers of flow paths with the same width.

For example, the narrowest layer among the layers can be 20% to 100% of the width of the widest layer, such as ⅕, ¼, ⅓, ½, or ⅔, ¾, ⅖, ⅗, ⅘, etc., of the width.

The height of each layer of flow path in the multi-layer mixing unit can be the same or different. In a specific embodiment, the height of each layer is the same.

In a preferred embodiment, in the sinuous multi-layer microstructure mixing unit, these layers of flow paths are always parallel in the semi-circular ring or semi-elliptical ring part.

In other words, each section of semi-circular ring flow path in each layer can form a concentric circle, or each section of semi-elliptical ring flow path in each layer can form a concentric and co-directional ellipse.

Figure 16:
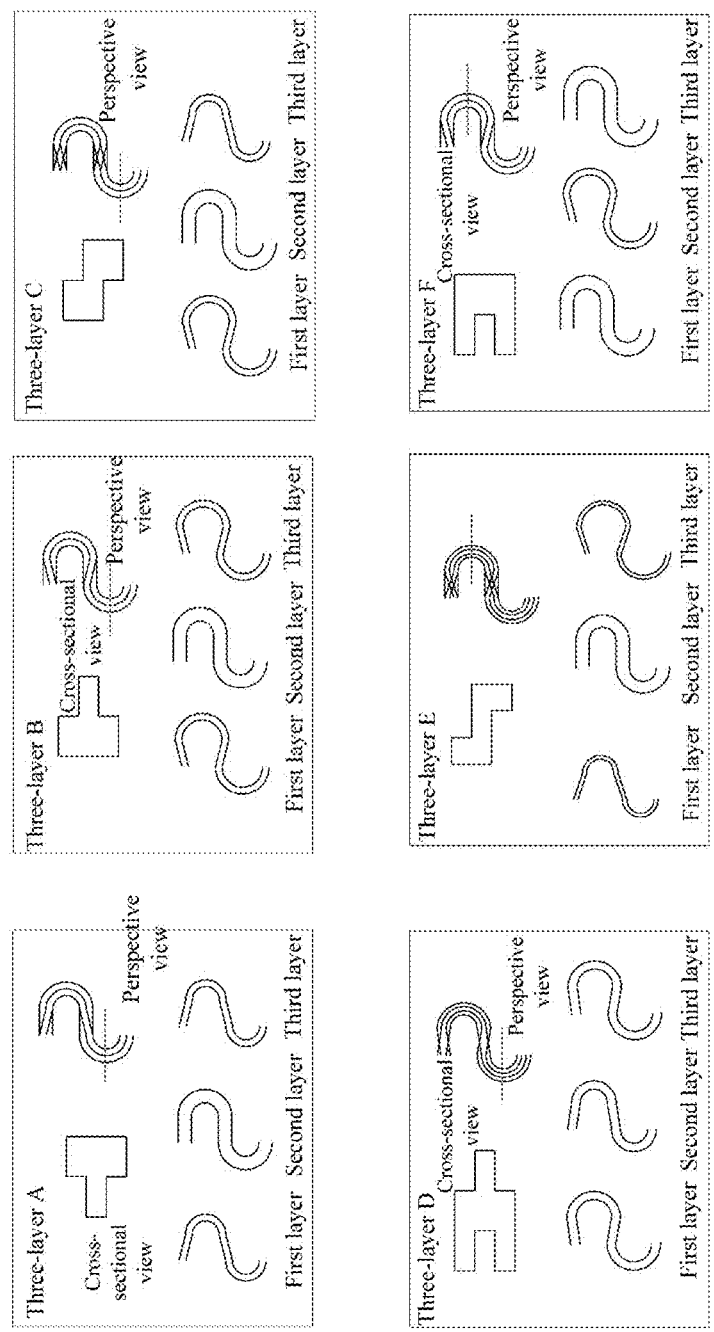
FIG. 16 shows schematic diagrams of sinuous three-layer microstructure mixing units, wherein A-F are respectively schematic diagrams of different embodiments.

On this basis, when the widths of two adjacent layers are different, it is preferable that outer edges of these layers of flow paths always coincide in the semi-circular ring or semi-elliptical ring part. Accordingly, when the widths of two adjacent layers are different, the orientation of the flow path is adjusted by the straight portion that connects two semi-circular rings or semi-elliptical rings, so that the above arrangement can be realized for each semi-circular ring or semi-elliptical ring. Specifically, when the width of each layer is different, the straight portions of the layers with different widths will present different angles with respect to the extension direction of the sinuous structure. In such a configuration, in the semi-circular ring or semi-elliptical ring part, the cross section of the multi-layer mixing part may be, for example, L-shaped (two layers), or may also be, for example, three-layer B, three-layer C and three-layer F as shown in FIG. 16.

In another embodiment, when the widths of two adjacent layers are different, the inner edges of these layers of flow paths always coincide in the semi-circular ring or semi-elliptical ring part. In such a configuration, in the semi-circular ring or semi-elliptical ring part, the cross section of the multi-layer mixing part may be, for example, L-shaped (two layers), or may also be, for example, three-layer A as shown in FIG. 16.

Figure 17:
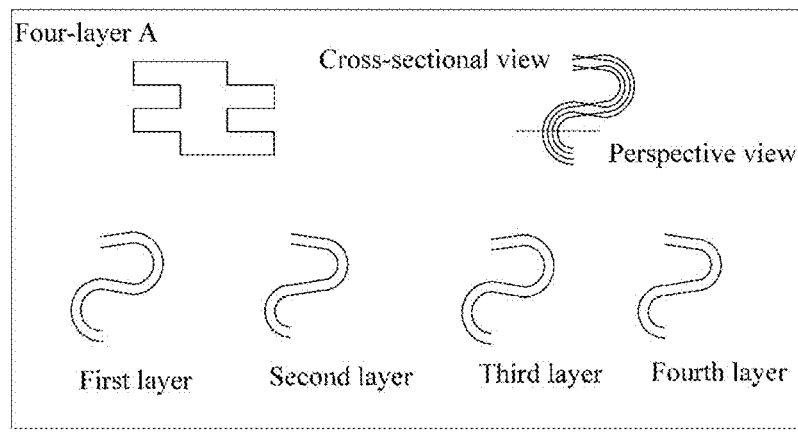
FIG. 17 shows schematic diagrams of sinuous three-layer microstructure mixing units, wherein A and B are respectively schematic diagrams of different embodiments.
Figure 17:
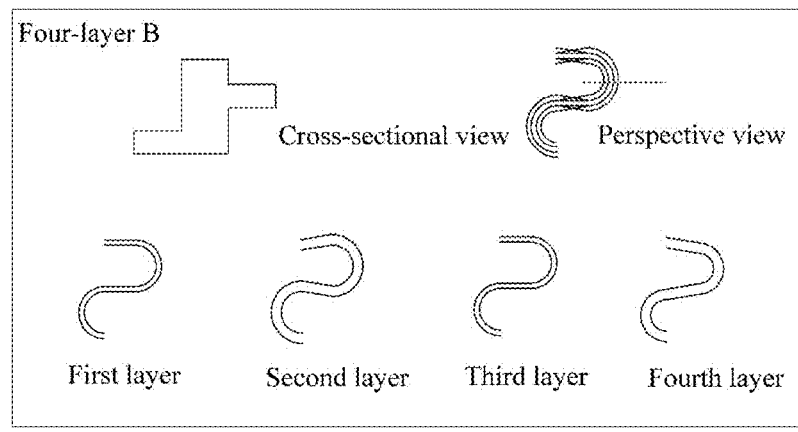
Figure 18:
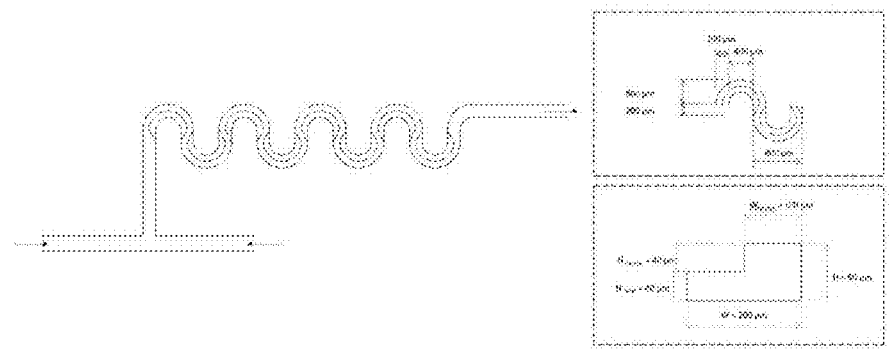
FIG. 18 is a schematic diagram of a double-layer structure mixing unit with a T-shaped mixing part.

In another embodiment, when the widths of two adjacent layers are different, for a mixing unit with at least three layers, there are two adjacent layers in which the outer edges of the flow paths always coincide in the semi-circular ring or semi-elliptical ring part; and there are also two adjacent layers in which the inner edges of the flow paths always coincide in the semi-circular ring or semi-elliptical ring part. In such a configuration, in the semi-circular ring or semi-elliptical ring part, the cross section of the multi-layer mixing part may be, for example, the cross section of the three-layer C and three-layer E as shown in FIG. 16 and the cross section of the four-layer B as shown in FIG. 17.

When each layer has the same width or two adjacent layers have the same width, in order to realize that the projection shapes of two adjacent layers are different and the flow paths are always parallel in the semi-circular ring or semi-elliptical ring part, two adjacent layers with the same width can be arranged in a staggered manner in width in the semi-circular ring or semi-elliptical ring part. Accordingly, the orientation of the flow path is adjusted by the straight portion that connects two semi-circular rings or semi-elliptical rings. In one embodiment, when two adjacent layers have the same width and are arranged in a staggered manner in width in the semi-circular ring or semi-elliptical ring part, those located on the outer side (i.e., those in which the inner diameter and outer diameter of the ring are both relatively large) in each semi-circular ring or semi-elliptical ring are always located on the outer side, and those located on the inner side are always located on the inner side. In such a configuration, in the semi-circular ring or semi-elliptical ring part, the cross section of the multi-layer mixing part may be, for example, as shown in FIG. 5C (double-layer), three-layer D in FIG. 16, and four-layer A in FIG. 17.

In various configurations, a preferred technical solution is that the flow paths in the semi-circular ring or semi-elliptical ring part are always parallel, and the outer edge of each layer (such as each of two or three layers) of flow path always coincides at the semi-circular ring or semi-elliptical ring part. Specific examples can be found in the structures of mixing units such as D-B1 and T-B1 in the present invention.

In the mixing part, the width of the sinuous flow path of the mixing part in the multi-layer mixing unit is represented by W, and the height is represented by H. Preferably, the height of the flow path of the mixing part is always kept constant. For the multi-layer mixing unit, the width and height of each layer can be expressed separately, for example, the width and height of a narrow layer can be expressed as $W_{narrow}$ and $H_{narrow}$, respectively, and the width of a wide layer can be expressed as $W_{wide}$ and $H_{wide}$. If only the width W is mentioned without specifying which layer it is, W shall be determined based on the projection shape of the flow path in the semi-circular ring or semi-elliptical ring part. If only the height H is mentioned without specifying which layer it is, it is the overall height of the stacked multiple layers of flow paths.

In a preferred embodiment, the width (W) of the sinuous flow path part is any value between 200 μm to 3000 μm, preferably 250 μm to 2000 μm, more preferably 300 μm to 1500 μm, even more preferably 400 μm to 1000 μm, for example, about 400 μm, 500 μm, 600 μm, 700 μm, 800 μm, 900 μm, or 1000 μm.

In a preferred embodiment, the height (H) of the sinuous flow path part is any value between 100 μm to 1500 μm, preferably 125 μm to 1000 μm, more preferably 150 μm to 750 μm, even more preferably 200 μm to 500 μm, for example, about 200 μm, 250 μm, 300 μm, 350 μm, 400 μm, 450 μm, or 500 μm.

In a preferred embodiment, the cross-sectional area of the sinuous flow path part is between 0.01 to 1 $mm^2$, preferably 0.04 to 0.8 $mm^2$, more preferably 0.06 to 0.5 $mm^2$, even more preferably 0.08 to 0.4 $mm^2$.

In a preferred embodiment, the width of each layer in the multi-layer mixing part is less than or equal to the width of the flow path at the junction between the confluence part and the outlet part in the multi-layer microstructure mixing unit and the mixing unit. In a preferred embodiment, the width of the widest layer in the multi-layer mixing part is equal to the width of the flow path at the junction between the confluence part and the outlet part in the multi-layer microstructure mixing unit and the mixing unit.

In the mixing part, the outer diameter of each semi-circular ring or the outer axial length of each elliptic ring in the extension direction of the sinuous form is expressed as Do; and the inner diameter of each semi-circular ring or the inner axial length of each elliptic ring in the extension direction of the sinuous form is expressed as Di. Since Do and Di are respectively inner and outer diameters, Do is equal to Di+2×W. For example, the length of Do can be 600-8000 μm, preferably 800-6000 μm, more preferably 1000-4000 μm, even more preferably 1500-3000 μm. For example, the length of Di can be 200-5000 μm, preferably 400-4000 μm, more preferably 600-3000 μm, even more preferably 800-2000 μm. For example, the length of Do can be about 3 to 5 times W, for example, about 4 times; and the length of Di can be about 1 to 3 times the W, for example, about 2 times. In the case of the multi-layer structure mixing unit, the values of Do and Di can be described based on layers. If only Do and Di are mentioned without specifying which layer it is, the values of Do and Di shall be determined based on the projection shape of the flow path in the semi-circular ring or semi-elliptical ring part.

In the mixing part, each pair of semi-circular rings or semi-elliptical rings with opposite bending directions are preferably connected via a length of straight flow path. The length of the straight flow path is described by the parameter Lc. It should be noted that Lc refers to the straight distance between two semi-circular rings or semi-elliptical rings in the fluctuation direction of the sinuous flow path, regardless of the included angle between this length of straight flow path and the fluctuation direction of the sinuous flow path, as shown in the accompanying drawings of the present invention. For example, the length (Lc) of the straight flow path is 0.5 W to 4 W, preferably 0.5 W to 3 W, more preferably 0.5 W to 2 W, and even more preferably 0.5 W to 1 W. For example, the length of the straight flow path can be any value between 200 and 6000 µm, preferably between 300 and 3000 µm, more preferably between 400 and 2500 µm, and even more preferably between 500 and 2000 µm. For example, Lc may have a length of about 500 µm, 1000 µm, 1500 µm, 2000 µm, 2500 µm, or 3000 µm.

The straight flow path is perpendicular to the extension direction of the sinuous flow path or forms an included angle with respect to the fluctuation direction of the sinuous flow path. For example, the included angle may be less than or equal to 45°, preferably between 9° and 270.

In an embodiment of a single-layer flow path, it is preferable that the straight flow path is perpendicular to the extension direction of the sinuous flow path. In the case of a multi-layer flow path, the included angle may be associated with many factors.

For example, where two adjacent layers of flow paths are unequal in width, the size of the included angle may depend on the length (Lc) of the straight flow path, the width value of the two flow paths, the width difference between the two flow paths, and the mode of arrangement (e.g., the alignment of the inner or outer edges). In some embodiments, the straight flow path of the widest layer in the multi-layer flow path is always perpendicular to the extension direction of the sinuous flow path.

For example, where two adjacent layers of flow paths have an equal width, the size of the included angle may depend on the length (Lc) of the straight flow path, the width of the flow path, and the degree to which the two adjacent layers of flow paths are staggered. In some embodiments, the respective straight flow paths in two equal-width layers of flow paths are at the same angle with respect to the extension direction of the sinuous flow path, but in opposite directions.

In order to generate a turbulent flow, it is preferable to adjust the arrangement of flow paths, so that in at least one flow path, the included angle makes the two straight flow paths form an inwardly converging structure relative to the semi-circular ring or semi-elliptical ring flow path between them, similar to the shape of a horseshoe.

In the mixing unit, whether single-layered or multi-layered, there may be n number of semi-circular rings or semi-elliptical rings. The number n can be any integer not equal to 1, preferably greater than or equal to 6, e.g., 6, 7, 8, 9, 10, or more, such as 10-15 or 15-20.

After passing through the mixing unit, the fluid mixture flows out from the outlet of the outlet part. In a preferred embodiment, the outlet part further comprises a length of flow path to connect the end of the mixing part to the outlet. The design and orientation of this length of flow path can be determined as required, and there are no special requirements. In a specific embodiment, the flow path between the end of the mixing part and the outlet is a straight flow path.

In an embodiment of the multi-layer microstructure mixing unit, it can be noted that only the cross section of the mixing part is not always rectangular. Especially for a multi-layer microstructure mixing unit comprising layers with different flow path widths, the cross section is not rectangular throughout the mixing part. However, the other parts of the mixing unit, e.g., the confluence part and the outlet part, which are in direct fluid communication with the mixing part, are not responsible for the effect of creating flow interruption, and there is no multi-layer structure, resulting in a rectangular cross section. Therefore, when the mixing part is brought into communication with the flow paths of the confluence part and outlet part, which have rectangular cross sections, there will be a transition part, in which the flow path width of one or more layers gradually changes, and finally the multi-layer structure disappears, so that the confluence part or the outlet part and the mixing part have the same rectangular cross section at the junction, thus enabling engagement.

In a specific embodiment, the multi-layer microstructure mixing unit of the present invention has the size and structure as shown in one of D-A1, D-B1, D-B2, D-B2-3, D-B2-5, D-B2-7, D-B3, D-B4, D-B5, D-B6, D-B7, D-C1, and T-B1 in Example Table 1, preferably the size and structure of D-B1, D-B2, D-B2-7, D-B4, D-B5, D-B6, D-B7, or T-B1, most preferably D-B1 and T-B1.

In a specific embodiment, the SML microstructure mixing unit of the present invention has the structure of D-B1 as shown in FIG. 1. The structure of the mixing unit D-B1 will be described in detail hereinbelow. The SML microstructure mixing unit of D-B1 comprises an inlet part, a confluence part, a multi-layer mixing part, and an outlet part in fluid communication. The multi-layer mixing part comprises two layers of sinuous flow paths, each layer of sinuous flow path comprises 10 semi-circular rings, and the Do and Di of each semi-circular ring are 2000 µm and 1000 µm respectively. Any two adjacent semi-circular rings have opposite bending directions and are connected to each other via a straight flow path, and the Lc is 1000 µm. The two layers of sinuous flow paths are always parallel in the semi-circular ring part and respectively have fixed widths and heights. The width of the narrow layer is 250 µm, the width of the wide layer is 500 µm, and the heights of the narrow layer and the wide layer are both 125 µm. The inlet part comprises two inlets, and the inlets are in fluid communication with the confluence part, so that different fluids flowing in from the inlets converge at the confluence part. The straight flow path of the inlet part and the confluence part are in the shape of the letter Y.

In a specific embodiment, the SML microstructure mixing unit of the present invention has the structure of T-B1. The configuration of the inlet part, confluence part and outlet part of the mixing unit T-B1 are the same as those of D-BT. The structure of the mixing part of the mixing unit T-B1 will be described in detail hereinbelow. The SML microstructure mixing multi-layer mixing part of T-B1 comprises three layers of sinuous flow paths, and the cross section thereof is as shown in FIG. 5D. In the three layers, each layer of sinuous flow path comprises 10 semi-circular rings, and the Do and Di of each semi-circular ring are 2000 µm and 1000 µm respectively. Any two adjacent semi-circular rings have opposite bending directions and are connected to each other via a straight flow path, and the Lc is 1000 µm. The three layers of sinuous flow paths are always parallel in the flow path of the semi-circular ring part and respectively have fixed widths and heights, and among them, the upper and lower layers are narrower (narrow layers) and the middle layer is wider (wide layer). The width of the narrow layer is 250 µm, the width of the wide layer is 500 µm, and the heights of the narrow layer and the wide layer are both 100 µm. The inlet part comprises two inlets, and the inlets are in fluid communication with the confluence part, so that different fluids flowing in from the inlets converge at the confluence part. The straight flow path of the inlet part and the confluence part are in the shape of the letter Y.

Multi-SML Mixing Device

The present invention further relates to a mixing device comprising the sinuous microstructure mixing unit, in particular a sinuous multi-layer (SML) microstructure mixing unit.

Since the SML microstructure mixing unit of the present invention is not easily blocked, it is suitable for scale-up. Therefore, in a preferred embodiment, the mixing device of the present invention comprises a plurality of SML microstructure mixing units and is also referred to as "multi-parallel mixing device". In a preferred embodiment, the plurality of SML microstructure mixing units are connected to each other in parallel. Through the parallel connection, the device of the present invention can achieve a greater flux.

In a preferred embodiment, in the multi-parallel mixing device, m number of parallel SML microstructure mixing units share one inlet part, and the inlet part enables a fluid flowing in from the same inlet to flow into m number of flow paths, each of which is in fluid communication with the confluence part or mixing part of an SML microstructure mixing unit, respectively. For example, after fluids flow in from at least two inlets, they are respectively split into m number of branch flow paths by flow paths in branched structures comprised in the respective inlet parts, and then, they are mixed in the independent confluence part or mixing part of each SML mixing unit. The branched structure can be finally divided into m number of branch flow paths by one or more branching points.

Similarly, m number of outflow ends of the m number of mixing parts are in fluid communication with the outlet part. The m number of parallel SML microstructure mixing units share one outlet part. The outlet part has a branched structure, which finally enables the fluids flowing out of the m number of mixing parts to converge into one flow path and come into fluid communication with the outlet via one or more branching points.

In one embodiment, the number m of the units in parallel is an even number, most preferably 2 to the power of n. In this way, a plurality of branched structures formed by bisecting branching points can be designed, and each pair of branches are bilaterally symmetrical to ensure precise pressure distribution. In order to ensure the precision of the pressure distribution, it is preferred that the units connected in parallel are identical, that is, have the same size and structure, and are symmetrically and evenly distributed in the device. In addition, when m is an even number, preferably 2 to the power of n, two independent mixing units can be configured as one group in the form of left and right mirror images for the convenience of combination.

As an example, the mode of distribution is as shown in FIG. 3A, FIG. 3B, FIG. 3C, FIG. 3D, FIG. 3E, FIG. 4A, FIG. 4B, FIG. 4C, FIG. 4D, FIG. 4E and FIG. 4F. This embodiment of the present invention is illustrated by 4 parallel mixing units in FIG. 3A-FIG. 3E. As shown in FIG. 3, the first layer is an inlet layer (FIG. 3A), which comprises two fluid (total) inlets (left and middle) and one fluid (total) outlet (right). Two inlets are respectively used for the inflow of two fluids to be mixed, and one outlet is used for the outflow of the mixed fluid. The second layer is a shunt layer (FIG. 3B), and its portions in fluid communication with the two inlets each comprise a length of straight flow path. Then, the straight flow path is bisected into two symmetrical branch flow paths, so that after the two fluids to be mixed flow in from the two inlets, they are respectively divided into two branches in the shunt layer and flow into the third layer. The third layer is a mixing layer (FIG. 3C). Each input flow path is bisected again in the third layer, and after passing through the bilaterally symmetrical non-linear flow paths, it converges with the other fluid. After passing through the confluence part, they enter the sinuous multi-layer mixing unit for mixing. After mixing, the mixed fluid further passes through an outlet flow path with two branching points, at each of which two fluids merge into one, such that eventually, these fluids merge at one point and are output from the outlet that is in fluid communication with the second layer and the first layer.

As can be seen from FIG. 3C and FIG. 3D, the multiple SML mixing units are composed of two groups of SML mixing units, and each group comprises two mirror-symmetrical mixing units and has a lantern-like structure as shown in FIG. 3C, FIG. 3D and FIG. 3E. Each lantern-like structure group necessarily has one inlet surrounded by a flow path, so the shunting between the lantern-like structure groups needs to be carried out in another layer, i.e., the shunting layer. Those skilled in the art would be aware that the key of the present invention to comprise the sinuous flow path of the present invention, rather than the final mixing device being composed of several layers of materials.

In one embodiment of the present invention, the device of the present invention is a device with four channels connected in parallel as shown in FIG. 3A-FIG. 3E or a device with 16 channels connected in parallel as shown in FIG. 4A-FIG. 4D.

The confluence part and the inlet part, which include the branched structure, may be in a different plane from the mixing part and/or the outlet part. The plane in which the confluence part and the inlet part are located is referred to as "shunting layer", which functions to shunt the merged fluid. The plane formed by the mixing part and the outlet part is referred to as "mixing layer", which plays the role of mixing and output.

In a specific embodiment, the SML mixing device is a microfluidic chip. The mixing device, such as a microfluidic chip, may further comprise or be connected to other elements, e.g., a syringe, an element for controlling the flow rate, such as a pump, a heater, and a detector.

In-Line Dilution

In one embodiment of the present invention, the device optionally further comprise an inlet for in-line dilution downstream of the SML mixing unit.

Figure 19:
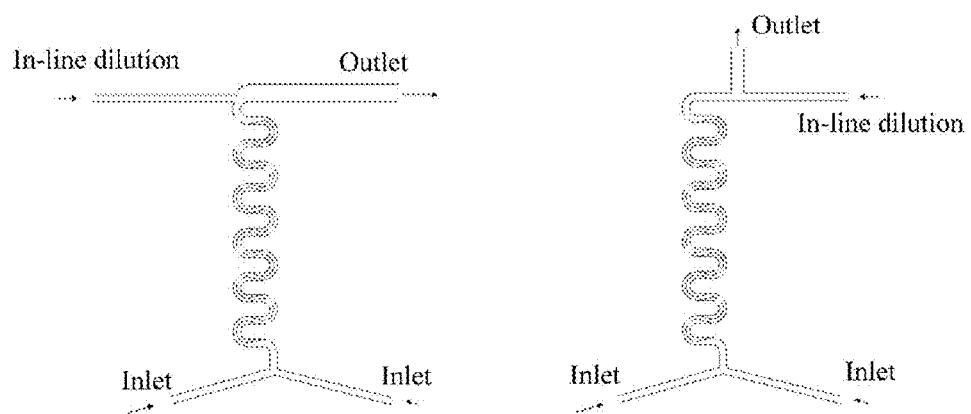
FIG. 19 is a schematic diagram of a double-layer structure mixing unit with an in-line dilution flow path at an outlet part.

FIG. 19 is taken as an example to illustrate the technical solution of in-line dilution. Specifically, in the outlet part of the SML mixing unit, preferably at a position near the outlet part and close to the mixing part for conveying a solvent for dilution, a diluent input flow path or a diluent inlet is further included, e.g., PBS or other suitable buffers and carriers, so that the concentration of each component in the fluid flowing through the mixing part is diluted before flowing out of the outlet. For example, the proportion of an original organic solvent such as ethanol in the solution is reduced. Excessive ethanol concentration may result in reduced stability of nanoparticles as the product, so a diluent input flow path and/or a diluent inlet are/is preferred.

For in-line dilution, the method of mixing is not limited. The in-line dilution can improve the stability of the nanoparticles.

The inflow rate of the diluent from the diluent inlet can be adjusted according to the desired dilution ratio. When preparing self-assembled nanoparticles, the dilution ratio can be any value from 1 to 40 times.

The diluent used for dilution can be a diluent commonly used in the art, e.g., saline or PBS.

The diluent flow path may also comprise other elements, e.g., a flow rate control device, such as a pump; or be connected to other elements, e.g., a device for inputting a fluid, such as a syringe.

Material of Mixing Unit

The mixing unit of the present invention can be made of a material having certain mechanical properties and biocompatibility, for example. Specific examples include polymer materials, metal materials, or inorganic nonmetallic materials.

Metal materials that can be used for preparing the mixing unit of the present invention can be, for example, stainless steel, aluminum alloy, magnesium alloy, and titanium alloy. 304 stainless steel, 316L stainless steel, and Hastelloy are preferred.

Polymer materials that can be used for preparing the mixing unit of the present invention can be, for example, polyetheretherketone (PEEK), polymethyl methacrylate (PMMA), polydimethylsiloxane (PDMS), polyamideimide (PAI), polychlorotrifluoroethylene (PCTFE), polytetrafluoroethylene (PTFE), polycarbonate (PC), polypropylene (PP), polyphenylene sulfide (PPS), cycloolefin copolymer (COC), and cycloolefin polymer (COP). Polyetheretherketone (PEEK), polyester (PET/PETP), cycloolefin copolymer (COC), cycloolefin polymer (COP), and polydimethylsiloxane (PDMS) are preferably used.

Inorganic nonmetallic materials that can be used for preparing the mixing unit of the present invention can be, for example, glass and ceramic.

Preparation of Mixing Unit

For example, the flow channel in the mixing unit of the present invention can be manufactured in any way known in the art or developed in the future, as long as the structure described in the present invention can be implemented. For example, a mechanical processing method can be used, such as precision CNC milling machine processing.

Where the mixing unit is prepared using a polymer material, thermoforming (such as injection molding process) or etching process (such as SU-8 glue) may also be used for processing. In the case of the multi-layer mixing unit, the layers can be manufactured separately and then sealed as a whole. The sealing between different layers can done by means of common sealing processes, such as hot-pressing sealing, laser sealing, and thin film sealing.

In other embodiments, it can also be directly encapsulated by means of a metal or polymer material.

Application

In one embodiment, the mixing unit and mixing device of the present invention can be used for producing the following four types of nanoparticles. Specifically, different fluids used for producing nanoparticles, e.g., a fluid containing a vehicle material and a fluid containing a load, are added through the inlet of the mixing unit or mixing device of the present invention and mixed by the mixing part of the present invention.

In a preferred embodiment, the self-assembly of the nanoparticles is achieved in the mixing part of the mixing unit and the mixing device of the present invention.

By means of the mixing unit or the mixing device of the present invention, nanoparticles with relatively uniform sizes can be obtained by means of efficient mixing. In an embodiment of the present invention, the nanoparticles prepared by the mixing unit of the present invention, especially LNPs with therapeutic molecules such as nucleic acid molecules as a load and a lipid as a vehicle material, have a DPI of not more than 0.3, preferably not more than 0.2.

(1) Lipid Nanoparticles

The mixing unit and device of the present invention are particularly suitable for producing lipid nanoparticles (LNPs) loaded with an object to be delivered. The object to be delivered can be nucleic acid molecules, including plasmids, ceDNAs, mRNAs, siRNAs, microRNAs, sgRNAs, etc., or may also be a small molecule or protein. When used for loading a nucleic acid material, the nucleic acid molecules may have any size between 20 bp and 15 kb. In a preferred embodiment, the mixing unit and device of the present invention are used for producing LNPs loaded with a nucleic acid. In a preferred embodiment, the LNP is an LNP comprising an ionizable lipid.

The lipid nanoparticles are generally composed of four types of lipids, specifically: (a) ionizable lipids or cationic lipids; (b) neutral lipids (or non-cationic lipids); (c) PEG-conjugated lipids; and (d) components that provide membrane integrity. In a specific embodiment of the present invention, the four types of lipids are dissolved in an ethanol phase, and the mixture enters the mixing unit or mixing device of the present invention from at least one inlet. Components used for preparing lipid nanoparticles are listed below, individually, which are suitable as the lipid components in (a) to (d) above.

(a) Ionizable Lipids or Cationic Lipids

The following can be listed as cationic lipids: for example, N,N-dioleyl-N,N-dimethylammonium chloride (DODAC); N-(2,3-dioleoyloxy)propyl)-N,N,N-trimethylammonium chloride (DOTMA); N,N-distearyl-N,N-dimethylammonium bromide (DDAB); N-(2,3-dioleoyloxy)propyl)-N,N,N-trimethylammonium chloride (DOTAP); 3-(N—(N',N'-dimethylaminoethane)-carbamoyl)cholesterol (DC-Chol); or N-(1,2-dimethoxyprop-3-yl)-N,N-dimethyl-N-hydroxyethylammonium bromide (DMRIE).

The following can be listed as ionizable lipids: for example, DLin-DMA, DLin-K-DMA, 98N12-5, C12-200, DLin-MC3-DMA, DLin-KC2-DMA, cKK-E12, SM-102, and ALC-0315.

Other suitable ionizable lipids that have been reported in the art can also be considered.

(b) Neutral Lipids (or Non-Cationic Lipids)

Non-cationic lipids that can be listed include but are not limited to distearoyl-sn-glycero-phosphoethanolamine, distearoylphosphatidylcholine (DSPC), dioleoylphosphatidylcholine (DOPC), dipalmitoylphosphatidylcholine (DPPC), dipalmitoylphosphatidylglycerol (DOPG), dipalmitoylphosphatidylglycerol (DPPG), dipalmitoylphosphatidylethanolamine (DOPE), palmitoyloleoylphosphatidylcholine (POPC), palmitoylphosphatidylethanolamine (POPE), dioleoylphosphatidylethanolamine 4-(N-maleimidemethyl)-cyclohexane-1-carboxylate (DOPE-mal), dipalmitoylphosphatidylethanolamine (DPPE), dimethylphosphatidylethanolamine (DMPE), distearoylphosphatidylethanolamine (DSPE), monomethylphosphatidylethanolamine (such as 16-O-monomethyl PE), dimethylphosphatidylethanolamine (such as 16-O-dimethyl PE), 18-1-trans PE, 1-stearoyl-2-oleoyl-phosphatidylethanolamine (SOPE), hydrogenated soybean phosphatidylcholine (HSPC), chicken egg phosphatidylcholine (EPC), dioleoylphosphatidylserine (DOPS), sphingomyelin (SM), dimyristoylphosphatidylcholine (DMPC), dimyristoylphosphatidylglycerol (DMPG), distearoylphosphatidylglycerol (DSPG), dierucoylphosphatidylcholine (DEPC), palmitoyl enol phosphatidylglycerol (POPG), distearoylphosphatidylethanolamine (DEPE), lecithin, phosphatidylethanolamine, thrombolytic lecithin, thrombolytic phosphatidylethanolamine, phosphatidylserine, phosphatidylinositol, sphingomyelin, egg sphingomyelin (ESM), cephalosporin, cardiolipin, phosphatidic acid, cerebroside, diacetyl phosphate, lysophosphatidylcholine, dioleoylphosphatidylcholine, or mixtures thereof. It can be understood that other diacyl phosphatidylcholine and diacyl phosphatidylethanolamine phospholipids may also be used. The acyl groups in these lipids are preferably acyl groups derived from fatty acids with C10-C24 carbon chains, for example, lauroyl, myristoyl, palmitoyl, stearoyl, or oleoyl.

Other examples of non-cationic lipids suitable for use in lipid nanoparticles include non-phospholipids, such as, for example, stearylamine, cltpdecylamine, hexaclecylarnine, acetyl palmitate, glyceryl trioleate, cetyl stereoester, isopropyl myristate, amphoteric acrylic polymer, triethanolamine-dodecyl sulfate, alkyl-aryl sulfate polyethoxylated fatty acid amide, octacosyldimethylammonium bromide, ceramide, sphingomyelin, etc. In some embodiments, the non-cationic lipid is a phospholipid. In some embodiments, the non-cationic lipid is selected from DSPC, DPPC, DMPC, DOPC, POPC, DOPE, and SM.

In some preferred embodiments, the non-cationic lipid is selected from DPSC, DPSC, or DOPE.

(c) PEG-Conjugated Lipids

The lipid particles further comprise a conjugated lipid, wherein the conjugated lipid can be, for example, selected from the group consisting of PEG-(DAG) (such as 1-(monomethoxy-polyethylene glycol)-2,3-dimethoxyglycerol (PEG-DMG)), PEG-distearoylphosphatidylethanolamine (PEG-DSPE), PEG-dialkoxypropyl (DAA), PEG-phospholipid, PEG-ceramide (Cer), PEG-PE, PEG diacylglycerol succinate (PEGS-DAG) (such as 4-O-(2',3'-bis(tetradecanoyloxy)propyl-1-O-(w-methoxy(polyethoxy) ethyl)succinate (PEG-S-DMG)), PEG dialkoxypropylcarbam, and N-(carbonylmethoxy polyethylene glycol 2000)-1,2-distearoyl-sn-glycero-3-phosphoethanolamine sodium salt.

(d) Components that Provide Membrane Integrity

The following can be listed as components that provide membrane integrity: for example, sterols and cholesterol.

(2) Polymer Nanoparticles

As polymer nanoparticles, the loaded substance is similar to liposome nanoparticles. The following can be listed as vehicle components: PLGA nanoparticles and PLA nanoparticles, for example. Generally, polymer nanoparticles contain a polymer and/or an amphiphilic polymer.

For example, non-limiting examples of hydrophobic polymers include, but are not limited to: polylactic acid (PLA), polypropylene oxide, poly(lactic-co-glycolic acid) (PLGA), poly(ε-caprolactone), poly(ethylene), polybutadiene, polyethylene glycol, polymethacrylate, polyvinyl butyl ether, polystyrene, polycyclopentadienyl methyl norbornene, polyethylene, polyisobutylene, and polysiloxane. As another example, the hydrophobic polymer may also be any of the following polymers: methyl acrylate, ethyl acrylate, propyl acrylate, n-butyl acrylate, isobutyl acrylate, 2-ethyl acrylate, tert-butyl acrylate, methacrylates (for example, ethyl methacrylate, n-butyl methacrylate and isobutyl methacrylate, ethyl methacrylate, n-butyl methacrylate and isobutyl methacrylate), acrylonitrile, methacrylonitrile, vinyl esters (such as vinyl acetate, trans vinyl ester, vinyl propionate, vinyl formamide, vinyl acetamide, vinyl pyridine and vinyl imidazole), aminoalkyl esters (such as aminoalkyl acrylate, aminoalkyl methacrylate, aminoalkyl (meth)acrylamide), styrene ester, and lactate ester.

Amphoteric polymers include poly(ethylene glycol)-poly (D,L-lactic acid) copolymer (PLA-PEG), PLGA-PEG, polystyrene-polyethylene oxide copolymer, poly(butyl acrylate)-polyacrylic acid copolymer, or poly(butyl methacrylate)-poly(ethylene oxide) copolymer. Other examples of amphiphilic copolymers are described in U.S. Patent Application Publication No. 2004/0091546, which is incorporated herein by reference in its entirety. Other examples of amphoteric polymers (e.g., amphoteric copolymers) are known in the art.

(3) Self-Assembly of Lipid-Polymer Hybrid Nanoparticles

The lipid-polymer hybrid nanoparticle material comprises the components of the lipid nanoparticles described in (1) and the polymer nanoparticles described in (2). For the selection of these two components, reference can be made to the respective sections above.

(4) Self-Assembly of Liposomes

The mixing unit and device of the present invention can also be used for the self-assembly of liposomes (or similar vesicles). The object to be delivered can be small molecules (e.g., poorly soluble cytotoxic drugs such as paclitaxel and camptothecin) or biological macromolecules (protein drugs).

Liposomes are generally composed of phospholipids (e.g., neutral lipids, cationic lipids, and ionizable lipids as mentioned above) and components that provide membrane integrity. Special types of liposomes may also comprise other components. For example, long-circulating liposomes comprise PEG-conjugated lipids.

Flow Rate and TFR

During the production of nanoparticles, the two fluids to be mixed are generally an ethanol phase and an aqueous phase, and the volume ratio of the ethanol phase to the aqueous phase is generally 1:3. Accordingly, in order to achieve a volume ratio of 1:3, the flow rate ratio of the two fluids entering the inlet is also 1:3. In other words, the inlet flow rate of the ethanol phase is 25% of TFR, and the inlet flow rate of the aqueous phase is 75% of TFR. Following the same principle, the inlet flow rates of the different fluids to be mixed can be adjusted according to the desired volume ratio.

The inventors have found that different flow path designs require different TFRs. The various SML mixing units of the present invention are particularly suitable for achieving excellent mixing effects at low flow rates, i.e., at a TFR of 1-4 mL/min.

In a preferred embodiment, the present invention provides a method for preparing nanoparticles by self-assembly, which comprises mixing a first fluid containing a vehicle material (e.g., a lipid, such as one or more lipids) with a second fluid containing a load (e.g., a nucleic acid, such as a DNA or an RNA) using the sinuous multi-layer microstructure mixing unit of the present invention, wherein in the method, a TFR of 1-12 mL/min is used, preferably 1-6 mL/min, more preferably 1-5 mL/min, even more preferably 1-4 mL/min. For example, in the case of using the mixing units D-B4, D-B5, D-B6, and D-B7, a higher TFR can be used, for example, a TFR of 4-12 mL/min is used. The corresponding TFRs can be used as described in Table 3. In the case of using the preferred mixing unit D-B1, D-B2, D-B2-7, or T-B1, a lower TFR can be used, for example, a TFR of 1-4 mL/min is used, and these mixing units can result in desired products at a TFR as low as 1 mL/min.

The present invention further relates to the following items:

1. A sinuous multi-layer (SML) microstructure mixing unit, comprising an inlet part, a confluence part, a multi-layer mixing part, and an outlet part in fluid communication, wherein
   each layer in the multi-layer mixing part is a sinuous flow path, and the sinuous flow path of each layer comprises n number of semi-circular rings or semi-elliptical rings, and any two adjacent semi-circular rings or semi-elliptical rings have opposite bending directions and are connected to each other via a straight flow path;
   projection shapes of two adjacent layers in the multi-layer mixing part always at least partially but not completely coincide throughout the flow path of the mixing part; and
   the inlet part comprises at least two inlets, and the inlets are in fluid communication with the confluence part, so that different fluids flowing in from the inlets converge at the confluence part.
2. The SML microstructure mixing unit according to item 1, wherein the mixing part comprises 2, 3, 4, or 5 layers of the sinuous flow paths.
3. The SML microstructure mixing unit according to item 1 or 2, wherein each layer of sinuous flow path has a fixed width, and the widths of these layers of sinuous flow paths can be the same or different from each other; preferably, at least two layers of sinuous flow paths have different widths.
4. The SML microstructure mixing unit according to any one of items 1 to 3, wherein these layers of flow paths are always parallel in the semi-circular ring or semi-elliptical ring part of the mixing part.
5. The SML microstructure mixing unit according to item 4, wherein outer edges of these layers of flow paths always coincide in the semi-circular ring or semi-elliptical ring part of the mixing part.
6. The SML microstructure mixing unit according to any one of items 1 to 5, wherein (a) the mixing part comprises two layers of sinuous flow paths, and cross sections of the sinuous flow paths are L-shaped in the semi-circular ring or semi-elliptical ring part; or (b) the mixing part comprises three layers of sinuous flow paths, and cross sections of the sinuous flow paths are in a T shape rotated by 90° in the semi-circular ring or semi-elliptical ring part.
7. The microstructure mixing unit according to any one of items 1 to 6, wherein an outer diameter Do of each semi-circular ring or an outer axial length Do of each elliptical ring in the extension direction of the sinuous form in each layer of sinuous flow path is 3 to 5 times the width of the flow channel; and/or an inner diameter Di of each semi-circular ring or an inner axial length Di of each elliptical ring in the extension direction of the sinuous form is 1 to 3 times the width of the flow channel.
8. The microstructure mixing unit according to any one of items 1 to 7, wherein the width W of the overall projection shape of one or more layers of sinuous flow paths is 200 μm to 3000 μm.
9. The microstructure mixing unit according to any one of items 1 to 8, wherein the overall height H of one or more layers of sinuous flow paths is 100 μm to 750 μm.
10. The microstructure mixing unit according to any one of items 1 to 9, wherein each pair of semi-circular rings or semi-elliptical rings with opposite bending directions are preferably connected by a length of straight flow path, and the length Lc of the straight flow path is 0.5 W to 4 W, preferably 1 W to 3 W, more preferably 1 W to 2 W.
11. The microstructure mixing unit according to any one of items 1 to 10, wherein n is an integer greater than or equal to 6, preferably any integer from 7 to 15.
12. The microstructure mixing unit according to any one of items 1 to 11, wherein the microstructure mixing unit comprises two or three layers of the sinuous flow paths, each layer of sinuous flow path comprises 6 to 10 semi-circular rings, and the length Lc of the straight flow path between semi-circular ring flow paths is greater than or equal to the inner diameter Di of a projection shape of the semi-circular ring flow path.
13. The microstructure mixing unit according to item 12, wherein at least two layers of the sinuous flow paths have different widths, and the width of a narrower layer is between 25% and 75%, preferably about 50% of the width of a wider layer.
14. The microstructure mixing unit according to item 13, wherein the narrower layer always coincides with the outer edge of the wider layer throughout the whole semi-circular ring flow path, and preferably, all the layers always coincide at the outer edge throughout the whole semi-circular ring flow path.
15. The microstructure mixing unit according to item 13, wherein the microstructure mixing unit has the structure and size of D-B1 or T-B1 as described in Table 1.
16. A microstructure mixing device comprising m number of the microstructure mixing unit according to any one of items 1 to 15 in parallel, wherein the m number of microstructure mixing units are in fluid communication via an inlet part, a confluence part and/or an outlet part, wherein m is an integer greater than 1.
17. The microstructure mixing device according to item 16, wherein m is an even number, and preferably, m is 2 to the power of an integer.
18. The microstructure mixing device according to item 16 or 17, wherein the microstructure mixing device is a microfluidic chip and optionally comprises other elements selected from the group consisting of a syringe, a pump, a heater, and a detector.
19. A method for mixing different fluids, comprising mixing a first fluid with a second fluid by means of the microstructure mixing unit according to any one of items 1 to 15 or the microstructure mixing device according to any one of items 16 to 18, wherein the first fluid is allowed to flow into a first inlet, and the second fluid is allowed to flow into a second inlet.
20. A method for preparing nanoparticles by self-assembly, comprising mixing a first fluid with a second fluid by means of the microstructure mixing unit according to any one of items 1 to 15 or the microstructure mixing device according to any one of items 16 to 18, wherein the first fluid is allowed to flow into a first inlet, and the second fluid is allowed to flow into a second inlet; and the first fluid is a fluid containing a nanoparticle vehicle material, and the second fluid is a fluid containing a nanoparticle load.
21. The method according to item 20, wherein the nanoparticle is a lipid nanoparticle, a polymer nanoparticle, a lipid-polymer hybrid nanoparticle, or a liposome.
22. The method according to item 21, wherein the nanoparticle is a lipid nanoparticle, the first fluid is a fluid containing one or more lipids, and the second fluid is a fluid containing a nucleic acid such as a DNA or an RNA.

PARTICULAR EMBODIMENTS

The sinuous multi-layer microstructure mixing unit of the present invention and the fluid mixing device comprising same will be described by the following embodiments.

Design of Mixing Unit

The parameters of the mixing units as specific embodiments of the present invention and the mixing units as comparative examples are listed in Table 1 below.

For the convenience of expression and comparison, the width and height are respectively shown after normalization. Specifically, assuming that 1 W=1000 μm and 1 H=500 μm, the width and height of each layer of flow path in the mixing part are expressed in folds or fractions relative thereto, respectively.

In Table 1, Y1, Y2, and T1 are simple traditional Y-shaped and T-shaped flow paths; S1-S4 are sinuous single-layer microstructure mixing units, and the cross sections of these seven flow paths are all rectangular, specifically square, throughout the mixing part. For the structure of each mixing unit, reference can also be made to the structural schematic diagrams in FIG. 1, FIGS. 5A-FIG. 5D, FIG. 6A-FIG. 6D, FIG. 7, FIG. 8A and FIG. 8B.

TABLE 1

Chip parameters used in the examples and their relationships

| No. | Type | Number of layers | Flow channel Shape | Lc Length | Flow channel Width | Flow channel Height | Number of semi-circular rings | Do/um | Di/um | Notes |
|---|---|---|---|---|---|---|---|---|---|---|
| Y1 | Y-type | — | — | — | 1W | 1H | — | — | — | |
| Y2 | Y-type | — | — | — | 2W | 2H | — | — | — | The width and height of flow channels are the same as those of D-B4. proportionally enlarged Y1 by 200%. |
| T1 | T-type | 1 | — | — | 1W | 1H | — | — | — | The size is the same as the flow channel of Y1. The angle between the inlet part and the confluence part is 90°. |
| S1 | S-type | 1 | — | 1Lc | 1W | 1H | 11 | 1Do | 1Di | S-type |
| S2 | S-type | 1 | — | 0.5Lc | 1W | 1H | 11 | 1Do | 1Di | Lc is reduced by half and the difference from S1 is only in the length Lc. |
| S3 | S-type | 1 | — | 2Lc | 2W | 2H | 10 | 2Do | 2Di | Proportionally enlarged S1 by 200%. Consistent with the shape of D-B5, but without a double-layer structure. |
| S4 | S-type | 1 | — | 3Lc | 3W | 3H | 10 | 1.5Do | 1.5Di | Proportionally enlarged S1 by 300%. Consistent with the shape of D-B7, but without a double-layer structure. |
| D-A1 | S-type | 2 | Narrow flow channel on the inner side. | 1Lc | 1W | 1H | 10 | | | D-A1 and D-B1, respectively with a narrow flow channel on the inner side and a narrow flow channel on the outer side. Double layers, with the same height. The width of the narrow layer is half that of the wide layer. |
| D-B1 | S-type | 2 | Narrow flow channel on the outer side | 1Lc | 1W | 1H | 10 | 1Do | 1Di | |
| D-B2 | S-type | 2 | Narrow flow channel on the outer side | 0.5Lc | 1W | 1H | 10 | 1Do | 1Di | Different from D-B1 only in the length Lc. Having 10 semi-circular rings. |
| D-B2-3 | S-type | 2 | Narrow flow channel on the outer side | 0.5Lc | 1W | 1H | 3 | 1Do | 1Di | Different from D-B2 only in the number of semi-circular rings. Having 3 semi-circular rings. |
| D-B2-5 | S-type | 2 | Narrow flow channel on the outer side | 0.5Lc | 1W | 1H | 5 | 1Do | 1Di | Different from D-B2 only in the number of semi-circular rings. Having 5 semi-circular rings. |
| D-B2-7 | S-type | 2 | Narrow flow channel on the outer side | 0.5Lc | 1W | 1H | 7 | 1Do | 1Di | Different from D-B2 only in the number of semi-circular rings. Having 7 semi-circular rings. |
| D-B3 | S-type | 2 | Narrow flow channel on the outer side | 0.2Lc | 0.4W | 0.4H | 10 | 0.4Do | 0.4Di | The core structure is proportionally reduced D-B2 (by 40%). |
| D-B4 | S-type | 2 | Narrow flow channel on the outer side | Lc | 2W | 2H | 10 | 2Do | 2Di | The core structure is proportionally enlarged D-B2 (by 200%). |
| D-B5 | S-type | 2 | Narrow flow channel on the outer side | 2Lc | 2W | 2H | 10 | 2Do | 2Di | Different from D-B4 in a longer Lc. Proportionally enlarged D-B1 by 200%. |
| D-B6 | S-type | 2 | Narrow flow channel on the outer side | 1.5Lc | 3W | 3H | 10 | 3Do | 3Di | Proportionally enlarged core area of D-B4 (by 150%). |
| D-B7 | S-type | 2 | Narrow flow channel on the outer side | 3Lc | 3W | 3H | 10 | 3Do | 3Di | Proportionally enlarged core area of D-B5 (by 150%). |
| D-C1 | S-type | 2 | Two staggered layers | 1Lc | 1W | 1H | 10 | 1Do | 1Di | Two layers, staggered. Lc is the same as in D-B1. Each layer has the same height. The width of each layer is ⅔ W. |

TABLE 1-continued

Chip parameters used in the examples and their relationships

| No. | Type | Number of layers | Flow channel Shape | Lc Length | Flow channel Width | Flow channel Height | Number of semi-circular rings | Do/um | Di/um | Notes |
| --- | --- | --- | --- | --- | --- | --- | --- | --- | --- | --- |
| T-B1 | S-type | 3 | Narrow flow channel on the outer side | 1Lc | 1W | 1.2H | 10 | 1Do | 1Di | 3 layers, each of which has the same height. The middle is a wide layer with a width of W; and the upper and lower layers are narrow layers, with a width of 0.5 W. |

(In the table, 1 W = 500 um, 1 H = 250 um, 1 Lc = 1000 um, 1 Do = 2000 um, and 1 Di = 1000 um)

Preparation of LNP Samples:

In order to test the effect of the microfluidic chip of the present invention, the various flow paths described in Table 1 were used to prepare LNP samples by mixing. Specifically, an aqueous phase (a citric acid buffer solution of anionic long-chain natural polymer molecules, which molecules are similar in structure to mRNAs and have a molecular weight of 15000 Da, hereinafter referred to as "mRNA-like material") and an ethanol phase (a lipid mixed solution) were mixed at a volume ratio of 3:1 at different flow rates to prepare LNP samples.

For the ethanol phase, ethanol stock solutions of SM-102 (8-[(2-hydroxyethyl)[6-oxo-6-(undecanoxy)hexyl]amino]-octanoic acid, 1-octyl nonyl ester), DSPC (distearoylphosphatidylcholine), cholesterol, and DMG-PEG (distearoylphosphatidylethanolamine-polyethylene glycol) were respectively prepared according to the concentrations shown in Table 2 and were uniformly mixed at a certain volume ratio to obtain a lipid material working solution as the ethanol phase. The concentrations and molar ratios of the various components in the lipid material working solution were shown in Table 2. Similarly, a citric acid buffer solution of 0.1 mg/mL mRNA-like material was prepared according to the concentration shown in Table 2. The prepared ethanol phase and aqueous phase were injected into a mixer at a volume ratio of 1:3 (100 μL: 300 μL) (adjusted by a syringe pump).

TABLE 2

LNP formula

| | Concentration, mg/mL | Volume, μL | Weight | Molar ratio % |
| --- | --- | --- | --- | --- |
| SM-102 | 3 | 100 | 0.3 | 50% |
| DSPC | 0.75 | | 0.075 | 10% |
| Cholesterol | 1.4 | | 0.14 | 38.5% |
| DMG-PEG | 0.4 | | 0.04 | 1.5% |
| Citric acid buffer solution of anionic long-chain molecules (RNA-like material) | 0.1 | 300 | 0.03 | |
| Total lipid | | | 5.55 | 0.555 |

Determination of Particle Size and PDI

After mixing by the microfluidic chip of the present invention, the obtained mixture was diluted with 400 μL of PBS and placed in a dialysis plate for ice bath dialysis for 2 h. After the dialysis was completed, the particle size and PDI of the obtained particles were detected by a nanoparticle size instrument (BeNano 90 Zeta).

The particle sizes in the following examples were all volumetric particle sizes. This was because the inventors found that for the LNP sample tested, the volumetric particle size was the closest to that determined by a transmission electron microscope (TEM), so that the size of the nanoparticles could be accurately reflected.

In the examples of the present invention, a PDI of <0.2 was considered to be good or desirable; a PDI of >0.2 and <0.3 was considered to be acceptable; and a PDI of >0.3 was considered to be undesirable.

In the examples of the present invention, a particle size (volumetric particle size) of <100 nm was considered to be desirable.

Example 1. Comparison of Mixing Units with Different Shape Structures

Figure 6A:
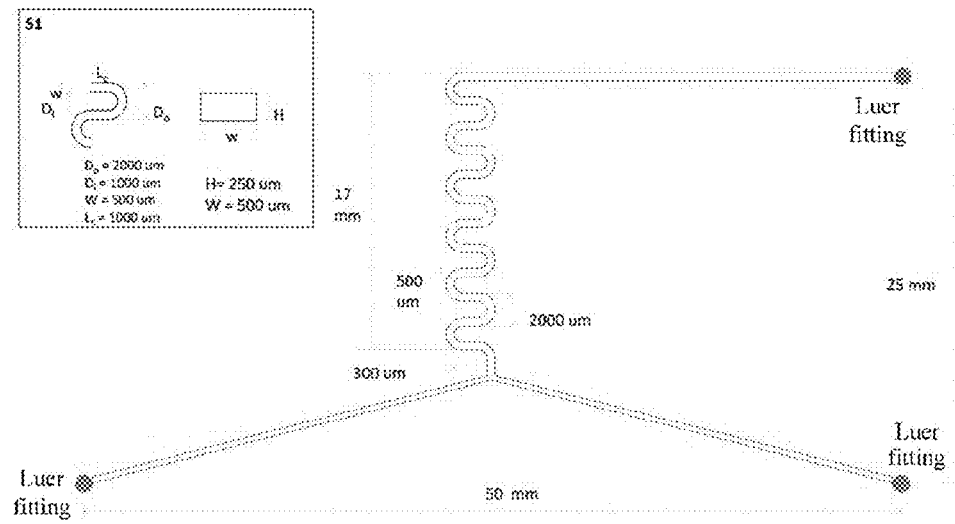
FIG. 6A is a schematic diagram of sinuous single-layer microstructure mixing unit S1.
Figure 6B:
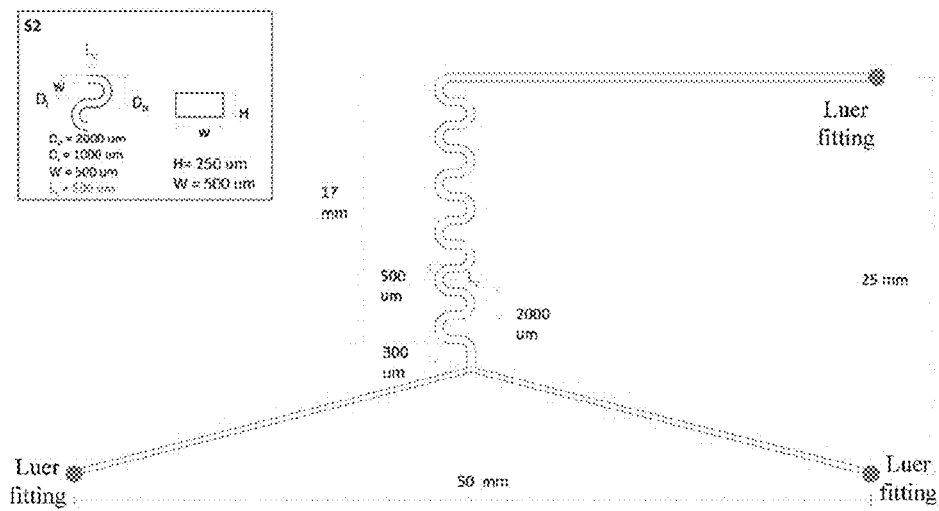
FIG. 6B is a schematic diagram of sinuous single-layer microstructure mixing unit S2.
Figure 6C:
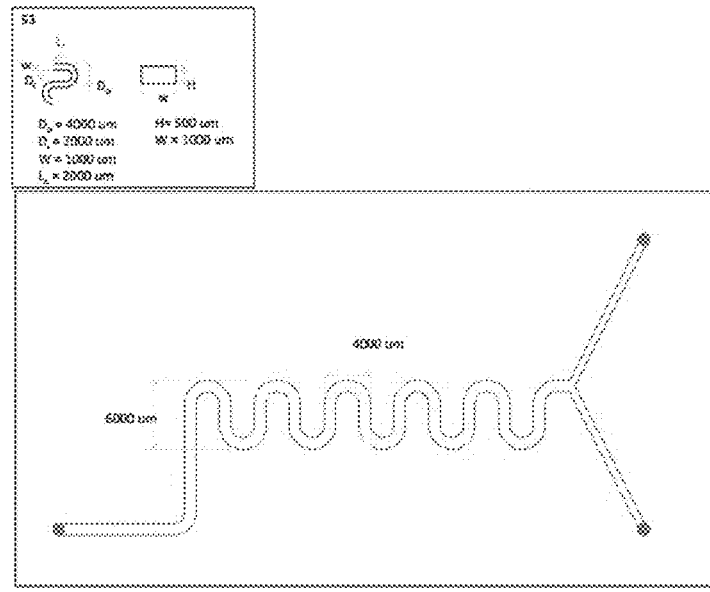
FIG. 6C is a schematic diagram of sinuous single-layer microstructure mixing unit S3.
Figure 6D:
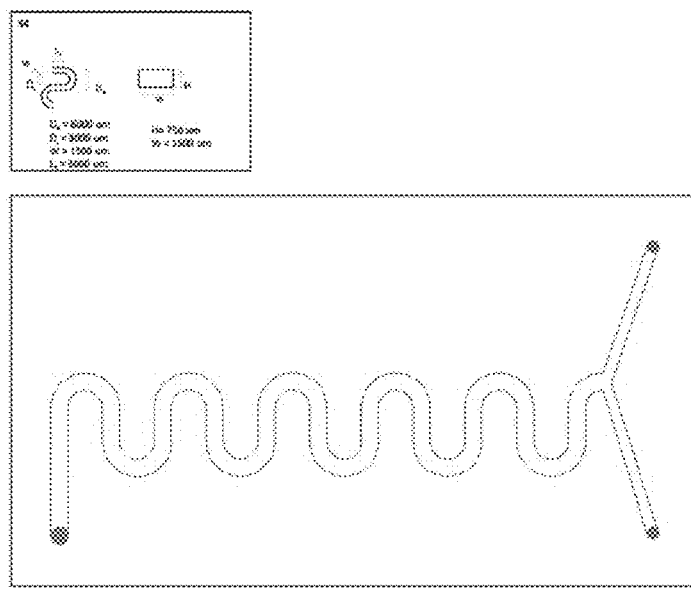
FIG. 6D is a schematic diagram of sinuous single-layer microstructure mixing unit S4. In each of FIGS. 6A-6D the panel at the top left shows a top view of a repeating unit of a sinuous flow path in a mixing part (left; comprising two semi-circular rings and two short straight flow paths) and a cross-sectional view of this flow path (right).
Figure 7:
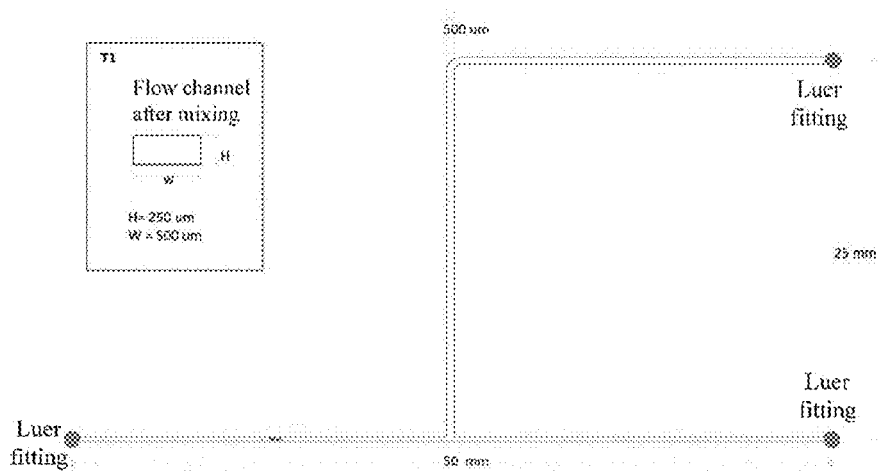
FIG. 7 is a schematic diagram of T-shaped mixing unit T1. The panel on the left is a cross-sectional view of a flow path of a mixing part.
Figure 8A:
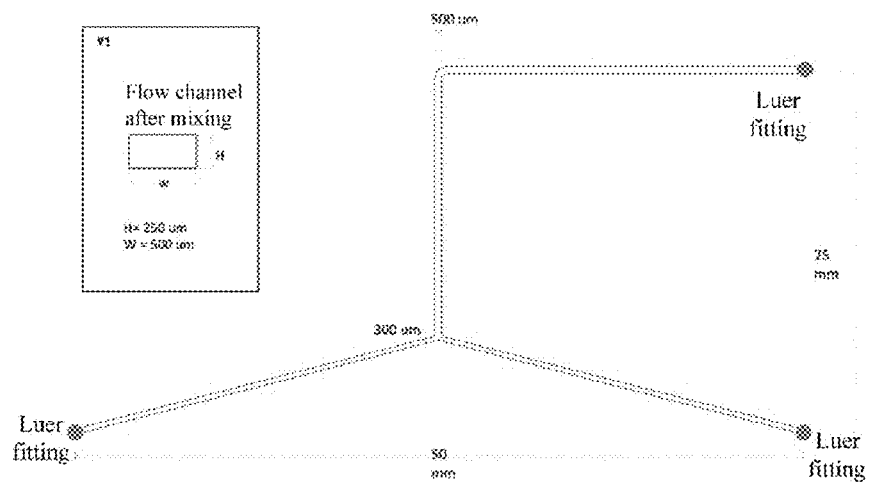
FIG. 8A is a schematic diagram of Y-shaped mixing unit Y1.
Figure 8B:
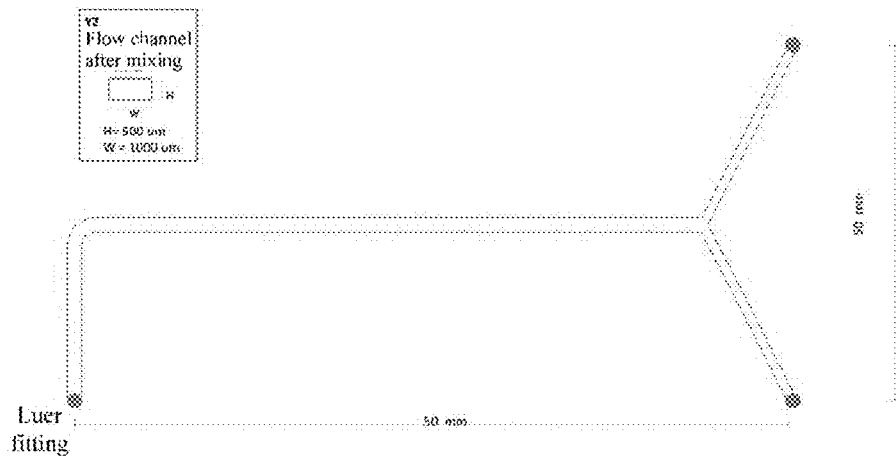

In this example, the mixing units numbered Y1, T1, S1, S2, and D-B1 in Table 1 were used to prepare microfluidic chips. Y1 was as shown in FIG. 8A, T1 was as shown in FIG. 7, and S1 was as shown in FIG. 6A The Lc of S2 was half of the Lc of S1, and the other parameters were the same. D-B1 was as shown in FIG. 5B.

Among the five types of mixing units, the straight flow path in the inlet part of T1 was perpendicular to the straight flow path in the confluence part, whereas the other four types of mixing units all presented certain angles. In addition, Y1, T1, S1, and S2 had rectangular sections which were conventional in the prior art, whereas D-B1 had a sinuous double-layer mixing unit of the present invention.

The experimental method was as described in the section "Preparation of LNPs" above. Various flow rates were tried. Specifically, the total flow rates of 1 mL/min and 6 mL/min were tried for the five types of mixing units. For the only sinuous double-layer mixing unit D-B1, an additional 4 mL/min was also tried. The statistical results of PDI and volumetric particle size of self-assembled nanoparticles prepared by chips comprising these mixing units were shown in FIG. 10.

Figure 10:
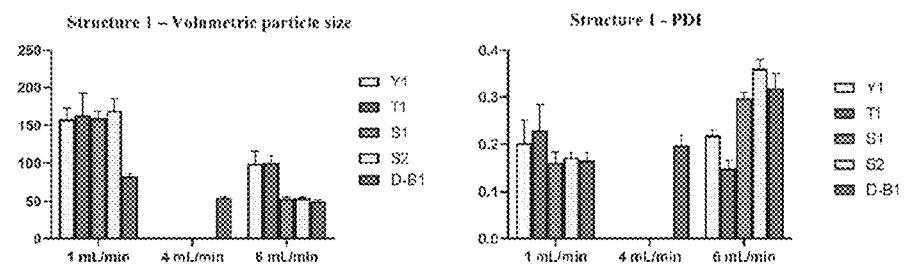
FIG. 10 shows histograms of the particle size (volumetric particle size) and PDI of particles obtained by sinuous microstructure mixing units Y1, T1, S1, S2, and D-B1.

As could be seen from FIG. 10, when the total flow rate was 1 mL/min, there was no obvious difference in particle size and PDI between the sinuous single-layer mixing units S1 and S2. It could be seen that in the case of the sinuous single-layer mixing units, Lc varied within the range of 0.5 to 1 mm and had no significant effect on PDI. At the flow rate of 1 mL/min, both S1 and S2 could achieve excellent mixing effects.

When the total flow rate was 6 mL/min, by comparing the chip S1 with S2, nanoparticles prepared by S2 with a shorter Lc had a slightly greater particle size and also a slightly greater PDI. It was indicated that in the case of using a sinuous single-layer mixing unit, when Lc was reduced from 1 mm in S1 to 0.5 mm in S2, the increase of the flow rate (from 1 mL/min to 6 mL/min) could lead to excessively intense mixing, which on the contrary led to aggregation.

Therefore, when the Lc in the structure of the present invention was considered to be shortened, especially to less than 1 mm, in order to ensure the quality of particles, it was preferable to maintain the total flow rate unchanged or reduce it, for example, to maintain the total flow rate at about 1 mL/min.

In another aspect, the effects of mixing units having the same sinuous design but different number of layers were compared. Compared with the single-layer S1, the double-layer D-B1 achieved a lower particle size at 1 mL/min. When the rate was increased to 6 mL/min, compared with the single-layer S1, the double-layer D-B1 resulted in the same particle size.

When considering the dispersion and aggregation of particles, although the double-layer D-B1 also presented increased PDI when the total flow rate was increased from 1 mL/min to 6 mL/min, the PDI of D-B1 was at a good level of 0.2 when the total flow rate was 4 mL/min.

In summary, as cloud be seen from FIG. 10, the flow rate suitable for each chip was different. 6 mL/min was suitable for Y1; 6 mL/min was suitable for T1. S1 and S2 resulted in large particle sizes and small PDIs at 1 mL/min and small particle sizes and large PDIs at 6 mL/min, indicating undesirability at both of these two flow rates. Among these chips, both the particle size and PDI from D-B1 were good at 1 mL/min and 4 mL/min, especially at 1 mL/min.

Example 2. Proportional Enlargement of Microstructure Mixing Units

In this example, the mixing units numbered Y2, S3, and D-B4 in Table 1 were used as chips. These three types of chips were made by the proportional enlargement of the sizes of Y1, S1, and D-B2 by 200%, respectively. Proportional enlargement means that the length, width and height were all amplified at the stated ratio. These three chips had the same included angles between the inlet part and the confluence part, but were different in that Y2 had a straight mixing part, S3 was a sinuous single-layer mixing unit, and D-B4 was a sinuous double-layer mixing unit.

The experimental method was as described in the section "Preparation of LNPs" above. Various flow rates were tried. Specifically, for the three types of mixing units, the following six total flow rates were tried: 1, 6, 12, 20, 24, and 30 mL/min; and for the two types of sinuous mixing units, 4 mL/min, which showed a good effect in Example 1, was also tried. The statistical results of PDI and volumetric particle size of self-assembled nanoparticles prepared by chips comprising these mixing units were shown in FIG. 11.

Figure 11:
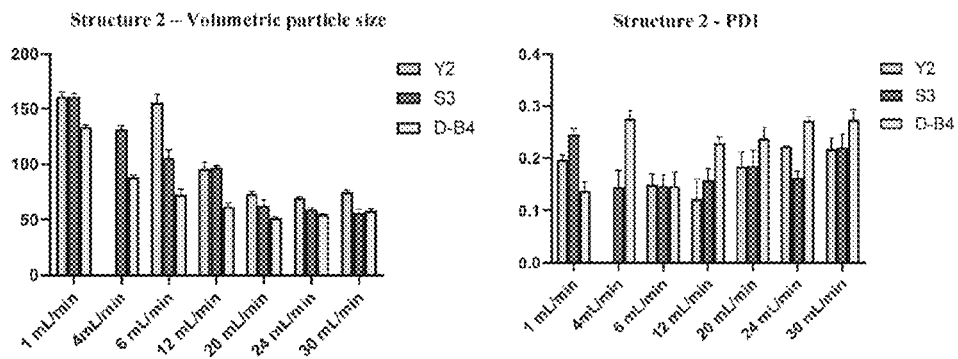
FIG. 11 shows histograms of the particle size (volumetric particle size) and PDI of particles obtained by mixing using sinuous microstructure mixing units Y2, S3, and D-B4.

As could be seen from FIG. 11, after proportional enlargement by 200%, at the various test flow rates, the particle sizes of the particles obtained by the mixing units Y2, S3, and D-B4 all decreased with the increase of the flow rate.

In addition, it was also noted that when the flow rate was increased to 20 mL/min, compared with the previous flow rate, each group showed increased PDI (but the PDI was still less than 0.3), which might be related to the fact that intense mixing caused aggregation when the flow rate was higher than 20 mL/min. Especially at a high flow rate, the PDI of D-B4 was greater than that of Y2 and S3, suggesting that the mixing process of two phases in the chip of the structure D-B4 was more intense than in the other two structures.

Specifically, at the low flow rates of 1, 4, and 6 mL/min and the medium flow rates of 6 and 12 mL/min, the particle size of the particles obtained by the sinuous double-layer structure D-B4 which had been enlarged by 200% was smaller than that of the particles obtained by the sinuous single-layer structure S3 which had been enlarged by 200%, suggesting that the sinuous double-layer structure had obvious mixing advantages at the low flow rates; in addition, after the total flow rate was increased to 20 mL/min, the difference in particle size between the particles obtained from the sinuous single-layer structure S3 which had been enlarged by 200% and the particles obtained by the sinuous double-layer structure D-B4 which had been enlarged by 200% became smaller.

The above results suggested that after size enlargement, the mixing advantage caused by the difference of the number of layers decreased with the increase of total flow rate.

Among the three structures, D-B4 could achieve good mixing at 6 mL/min and resulted in small and uniform particles, indicating that it required a smaller flow rate than the other two chips and was more suitable for use at a low working flow rate. For S3, 6 mL/min, 12 mL/min, 20 mL/min, and 24 mL/min were suitable as working flow rates, and for Y2, 12 mL/min and 20 mL/min were suitable as working flow rates.

In summary, after proportional enlargement, the single-layer-structured and double-layer-structured microstructure mixing units of the present invention both exhibited good mixing effects. The sinuous microstructure mixing unit of the present invention could allow the length and width of its flow path to vary within a certain range and could all still prepare nanoparticles with smaller and uniform particle sizes.

Example 3. Comparison of Different Lc

In this example, the mixing units numbered D-B1, D-B2, D-B4, and D-B5 in Table 1 were used as chips. D-B4 and D-B5 were proportionally enlarged structures of D-B2 and D-B1, respectively. The Lc of D-B1 was twice that of D-B2, and the Lc of D-B5 was twice that of D-B4.

The experimental method was as described in the section "Preparation of LNPs" above. In the comparison of D-B1 with D-B2, various flow rates were tried. Specifically, the total flow rates of 1 mL/min, 4 mL/min, and 6 mL/min were tried. The statistical results of PDI and volumetric particle size of self-assembled nanoparticles prepared by chips comprising these mixing units were shown in FIG. 13.

Figure 13:
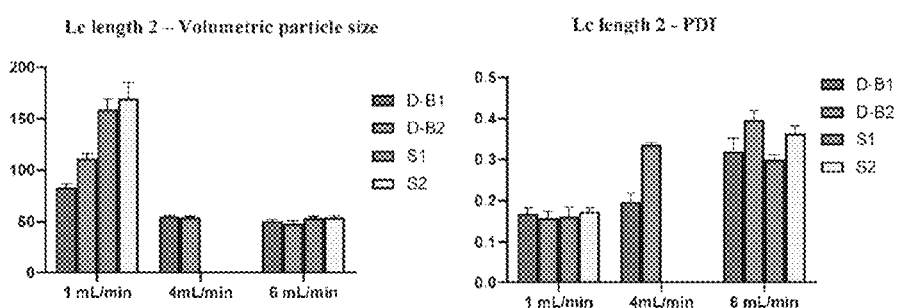
FIG. 13 shows histograms of the particle size (volumetric particle size) and PDI of particles obtained by sinuous microstructure mixing units D-B1, D-B2, S1, and S2.

As could be seen from FIG. 13, the PDI of D-B1 was significantly smaller than that of D-B2 at both the flow rates of 4 mL/min and 6 mL/min and had a comparable particle size. It was indicated that for the chip having a flow channel with the size being 0.5 W*0.5 H, a longer Lc could result in a better control of PDI. This might be due to the fact that a shorter Lc led to more intense mixing, causing collision and aggregation of some nanoparticles.

The experimental method was as described in the section "Preparation of LNPs" above. In the comparison of D-B4 with D-B5, various flow rates were tried. Specifically, the following 7 total flow rates were tried for both the two types of mixing units: 1, 4, 6, 12, 20, 24, and 30 mL/min. The statistical results of PDI and volumetric particle size of self-assembled nanoparticles prepared by chips comprising these mixing units were shown in FIG. 12.

Figure 12:
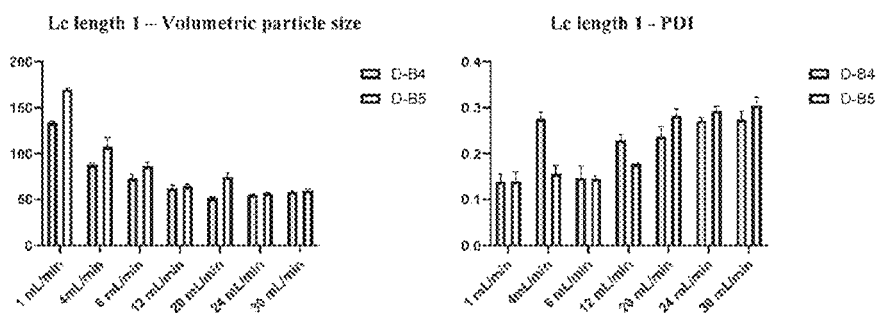
FIG. 12 shows histograms of the particle size (volumetric particle size) and PDI of particles obtained by sinuous microstructure mixing units D-B4 and D-B5.

As could be seen from FIG. 12, the D-B5 group resulted in larger volumetric particle sizes than those in the D-B4 group at all the rates. In the figure, at the flow rates of 12, 24, and 30 mL/min, the D-B5 group resulted in volumetric particle sizes close to those in the D-B4 group. It was suggested that after proportional enlargement of the system, the increase of Lc might slow down the intensity of local mixing and led to an increased particle size.

In addition, this example suggested that in the observation results of the two groups, when the total flow rate was from 1 to 30 mL/min, the proportionally enlarged systems showed decreased particle sizes with the increase of the flow rate and increased PDI with the increase of the flow rate. After the flow rate was higher than 12 mL/min, the PDIs in the two groups were higher than 0.2, and the trend of PDI increasing with the flow rate became significant. Notably, when the flow rate was equal to 12 mL/min, D-B4 and D-B5 resulted in the same particle size, and D-B5 resulted in a significantly smaller PDI than D-B4. LNPs with both the particle size and PDI being desirable were obtained.

This example suggested that the extension of Lc might result in a better control of the PDI of the prepared LNPs, so that LNPs with both the particle size and PDI being desirable could be obtained within a wider range of preparation flow rate.

Example 4. Comparison of Different Numbers of Semi-Circular Rings

In this example, the mixing units numbered D-B2-3, D-B2-5, D-B2-7, and D-B2 in Table 1 were used to prepare microfluidic chips. These four types of mixing units were all sinuous double-layer mixing units, and the only difference was that the number of semi-circular rings comprised in the sinuous part was different, that is, the number of turns was different.

The experimental method was as described in the section "Preparation of LNPs" above. Various flow rates were tried. Specifically, the total flow rates of 1 mL/min, 4 mL/min, and 6 mL/min were tried for the four types of mixing units. The statistical results of PDI and volumetric particle size of self-assembled nanoparticles prepared by chips comprising these mixing units were shown in FIG. 20.

Figure 20:
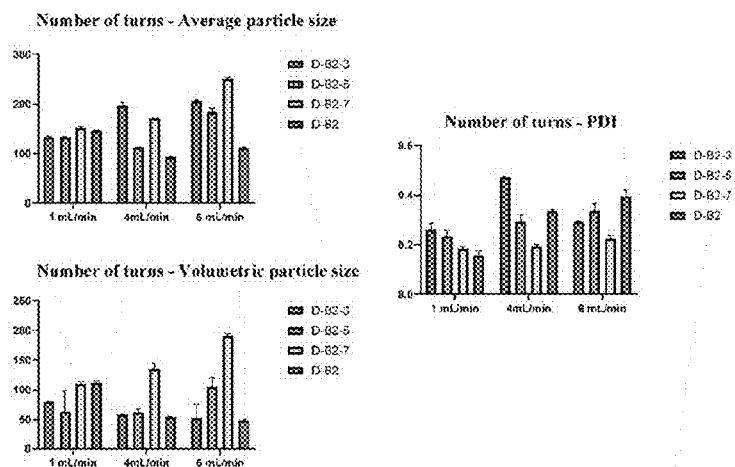
FIG. 20 shows the results of Example 5 and compares histograms of the PDI and particle size (volumetric particle size) of nanoparticles prepared by double-layer structure mixing units with different numbers of semi-circular rings.

As could be seen from FIG. 20, for both D-B2 and D-B2-7, 1 mL/min was suitable, and for D-B2-3 and D-B2-5, it was difficult to prepare LNPs with small sizes and good uniformity at these several flow rates. In the results, the result obtained at the flow rate suitable for D-B2 was consistent with the other examples. In addition, the results in FIG. 20 also indicated that the number of semi-circular rings in the sinuous mixing unit should not be too small and should be preferably at least 6, more preferably at least 7.

Example 6. Comparison of Sinuous Single-Layer and Multi-Layer Microstructure Mixing Units In this example, the inventors used the mixing units numbered S1, D-A1, D-B1, D-C1, and T-B1 in Table 1 to prepare microfluidic chips, and each of the chips comprised only one of these mixing units. The design of the chips was similar to that in FIG. 1, and the only difference was the mixing part.

Lipid nanoparticles were prepared by using these chips, and the parameters, such as PDI and volumetric particle size, of the obtained lipid nanoparticles were determined.

These five types of mixing units were all sinuous microstructure mixing units. Except the height of each layer of T-B1, the main parameters, such as Do, Di and Lc, of each mixing unit were essentially the same. The most important difference was that the number of layers was different. The mixing part of S1 was a sinuous single-layer flow path, the mixing parts of D-A1, D-B1, and D-C1 were sinuous double-layer flow paths, and the mixing part of T-B1 was a three-layer flow path. Schematic and cross-sectional views of D-A1, D-B1, D-C1, and T-B1 were shown in FIGS. 5A, FIG. 5B, FIG. 5C and FIG. 5D, respectively, with the top perspective view on the left and the corresponding cross-sectional shape schematic view on the right.

Figure 5A:
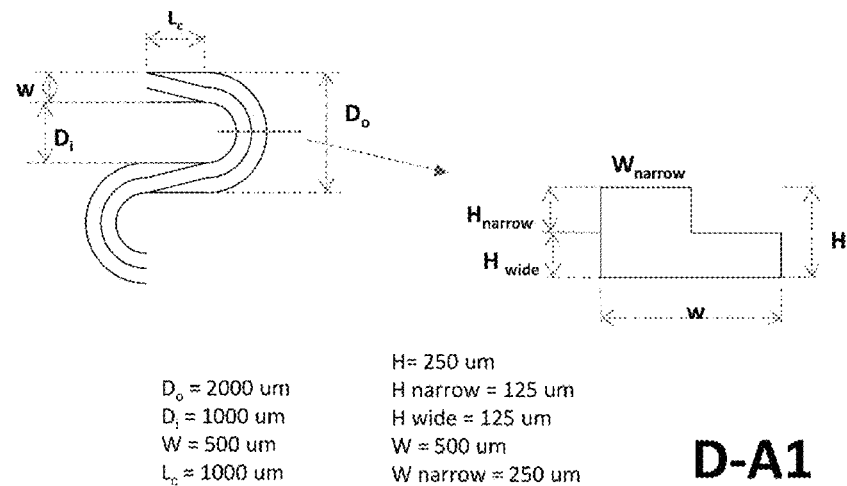
FIGS. 5A-5D are top views and cross-sectional views of repeating units in the mixing parts of four sinuous multi-layer microstructure mixing units D-A1, D-B1, D-C1, and T-B1 of the present invention.
Figure 5B:
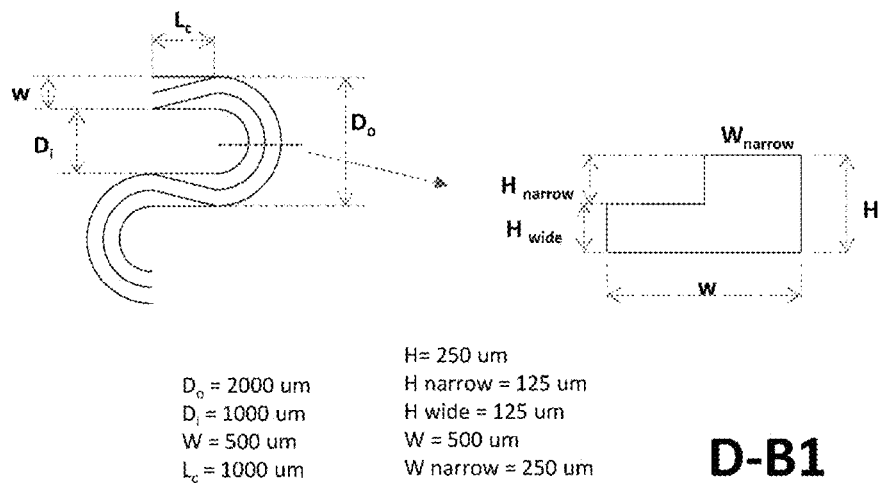
Figure 5C:
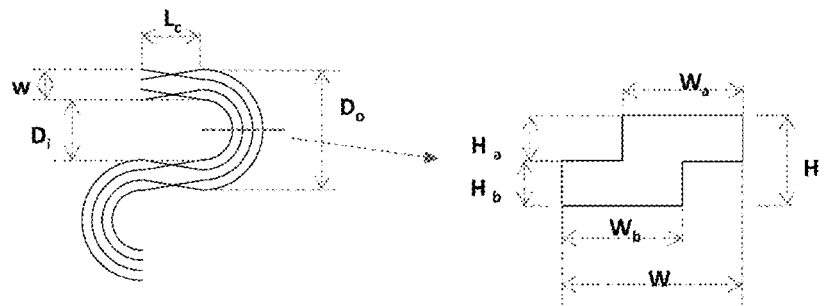
Figure 5D:
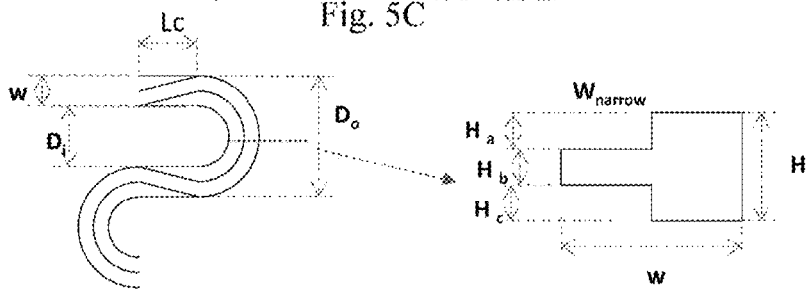
Figure 5D:
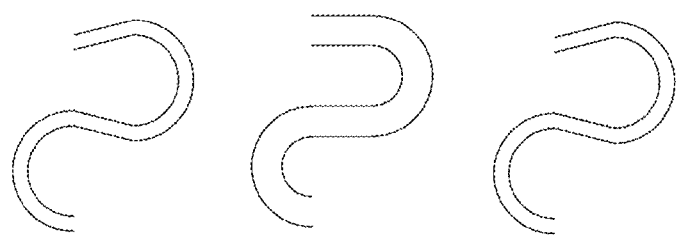

As shown in FIG. 5A, FIG. 5B and FIG. 5C, D-A1, D-B1, and D-C1 all had double-layer flow channels. The inner edge of the narrow flow path layer of D-A1 overlapped the inner edge of the wide flow path layer in the semi-circular ring part; and the inner edge of the narrow flow path layer of D-B1 overlapped the outer edge of the wide flow path layer in the semi-circular ring part. Where the length and shape of the wide flow path layer were the same and the width of the narrow flow path layer was the same, the length of the narrow flow path layer of D-B1 was longer than that of the narrow flow path layer of D-A1. Unlike D-A1 and D-B1, D-C1 had double layers of flow paths with the same width, which were staggered in width in the semi-circular ring part, forming a cross section similar to the letter Z in Tetris.

The experimental method was as described in the section "Preparation of LNPs" above, wherein various flow rates were tried and were the total flow rates of 1, 4, and 6 mL/min, respectively. The statistical results of PDI and volumetric particle size of self-assembled nanoparticles prepared by chips comprising these mixing units were shown in FIG. 9.

Figure 9:
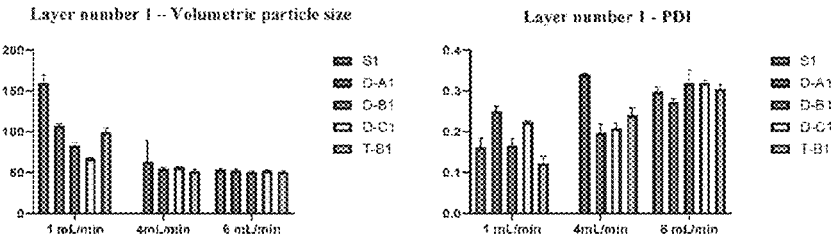
FIG. 9 shows histograms of the particle size (volumetric particle size) and PDI of particles obtained by mixing using sinuous microstructure mixing units S1, D-A1, D-B1, D-C1, and T-B1.

As could be seen from FIG. 9, at the total flow rate of 1 mL/min, the average particle size obtained by the chip that was a single-layer structure (S1) was greater than that obtained by the double-layer structure (D-A1, D-B1, and D-C1) and the three-layer structure (T-B1), and the average particle size obtained by the double-layer structure (D-A1, D-B1, and D-C1) was smaller than that obtained by the three-layer structure (T-B1). Among the chips with double-layer structures, the particle size was in the order of D-C1>D-B1>D-A1, and the PDI was in the order of D-A1>D-C1>D-B1. It could be seen that the performance of the double-layer structures was better than that of the three-layer and single-layer structures at the low flow rate of 1 mL/min. In addition, the double-layer structures, especially the D-B1 structure with the narrow part of the flow path on the outer side, were superior to the other two double-layer structures and were excellent in both particle size and dispersion. This was consistent with the results of Example 1. In addition, D-A1 was less preferable because it was difficult to control PDI to be not more than 0.2 at each flow rate.

Based on the above results, it could be seen that among these five structures, 1 and 4 mL/min were suitable as the working flow rates for D-B1, and 1 mL/min was suitable as the working flow rate for T-B1. Under these conditions, the obtained LNPs had smaller particle size and uniform dispersion.

Example 7. Number of Layers in Microstructure Mixing Units

In this example, the units numbered S2, D-B2, S3, D-B4, S4, and D-B7 were used as chips. Among them, S2 and D-B2 had the same shape and were respectively single-layered and double-layered; S3 and D-B4 had the same shape and were respectively single-layered and double-layered; and S4 and D-B7 had the same shape and were respectively single-layered and double-layered.

The experimental method was the same as described in the section "Preparation of LNPs" above, wherein various total flow rates were tested. The statistical results of the test flow rates, PDIs and volumetric particle sizes were shown in FIG. 14A, FIG. 14B and FIG. 14C, wherein FIG. 14A showed the results of S2 and D-B2, FIG. 14B showed the results of S3 and D-B4, and FIG. 14C showed the results of S4 and D-B7.

Figure 14A:
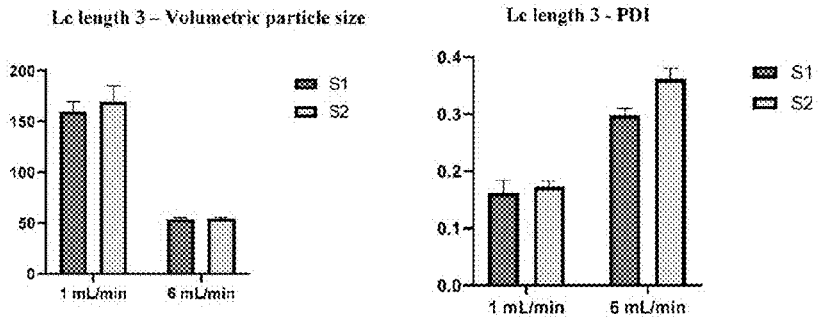
FIG. 14A shows histograms of the particle size (volumetric particle size) and PDI of particles obtained by sinuous microstructure mixing units S2 and D-B2.

As could be seen from FIG. 14A, the particle size decreased with the increase of the flow rate, and the PDI increased with the increase of the flow rate. Comparing the two mixing units, the particle size of LNPs prepared by the double-layer D-B2 was smaller. The single-layer S2 had a large particle size and a small PDI at 1 mL/min and a small particle size and a large PDI at 6 mL/min, indicating that neither of these two flow rates was suitable. LNPs with small sizes and good uniformity could be prepared by the double-layer D-B2 at 1 mL/min, and the PDI was too large at the flow rates of 4 and 6 mL/min.

Figure 14B:
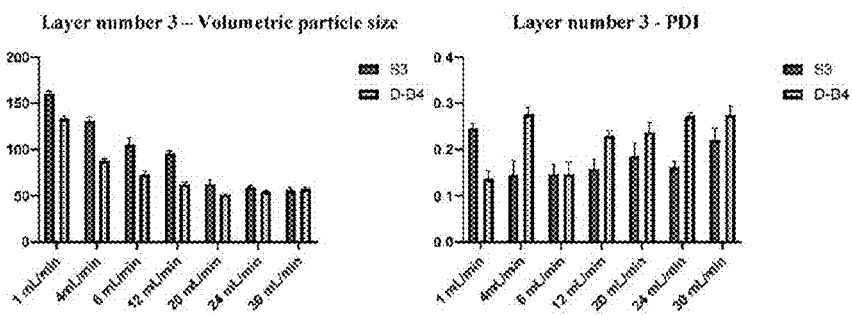
FIG. 14B shows histograms of the particle size (volumetric particle size) and PDI of particles obtained by sinuous microstructure mixing units S3 and D-B4.

As could be seen from FIG. 14B, the particle size decreased with the increase of the flow rate, and the PDI in the single layer first decreased and then increased, whereas the PDI in the double layer increased after the flow rate reached a certain value. In addition, at the same flow rate, the particle size of LNPs prepared by the double-layer D-B4 chip was generally smaller, which indicated that the mixing effect of the double-layer chip was better. However, after the flow rate was greater than 12 mL/min, it could lead to aggregation when mixing in in D-B4, resulting in increased PDI, whereas for S3, PDI was only slightly increased at a flow rate of 30 mL/min. S3 had good mixing effects at all of the flow rates of 6 mL/min, 12 mL/min, 20 mL/min, 24 mL/min, and D-B4 had the best mixing effect at 6 mL/min.

Figure 14C:
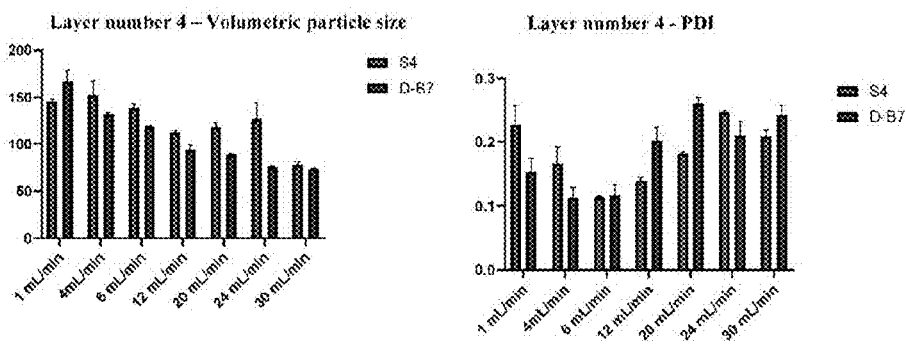
FIG. 14C shows histograms of the particle size (volumetric particle size) and PDI of particles obtained by sinuous microstructure mixing units S4 and D-B7.

As could be seen from FIG. 14C, the particle size decreased with the increase of the flow rate, and the PDI first decreased, and after the flow rate reached 12 mL/min, the PDI increased. By comparing the single layer with the double layer, it could be found that the particle size from the double-layer D-B7 was smaller than that from the single layer. The PDI from D-B7 was less than that from S4 at first, and after the flow rate reached 12 mL/min, the PDI was greater than that from S4. This was possibly because in the chip with a double-layer structure, the aqueous phase and the ethanol phase were mixed more evenly and the suitable flow rate was small. S4 at 12 mL/min and D-B7 at 4 mL/min could achieve the purpose of preparing LNPs with a small particle size and good uniformity.

In summary, the double-layer structure could result in nanoparticles with a smaller particle size at a lower flow rate due to a more intense mixing effect. Moreover, compared with the single-layer structure, the double-layer structure could better result in nanoparticles with both the particle size and PDI being relatively small within a fixed flow rate range.

Example 8. Enlargement of Microstructure Mixing Units

In this example, comparison was made between two groups of mixing units which had been proportionally enlarged and reduced in size. Specifically, the mixing units numbered D-B3, D-B2, D-B4, and D-B6 in Table 1 were used as one group, and D-B1, D-B5, and D-B7 as the other group, to respectively prepare chips for intra-group comparison. In these two groups, the difference between D-B1 and D-B2 as mentioned above was only that the Lc of the former was longer. Within each group, the difference between these mixing units lay in that the proportional enlargement and reduction factors of the size of the flow path were different.

Figure 15A:
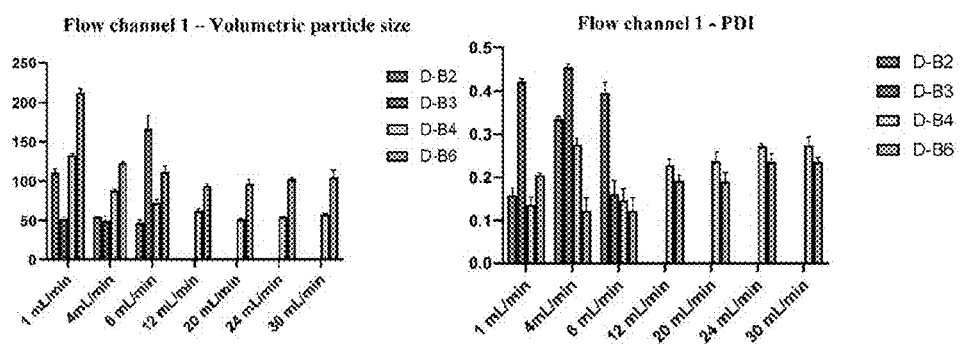
FIG. 15A shows histograms of the particle size (volumetric particle size) and PDI of particles obtained by sinuous microstructure mixing units D-B2, D-B3, D-B4, and D-B6.

The experimental method was the same as described in the section "Preparation of LNPs" above, wherein in terms of flow rate, the total flow rates of 1, 4, 6, 12, 20, 24, and 30 mL/min were used. The statistical results of PDI and volumetric particle size were shown in FIG. 15A and FIG. 15B. FIG. 15A showed the results of D-B3, D-B2, D-B4, and D-B6, and FIG. 15B showed the results of D-B1, D-B5, and D-B7.

As could be seen from FIG. 15A, the internal pressure of the small flow channel was too high to be suitable for use at a high flow rate. The channel of D-B3, which had been reduced, resulted in a small particle size but a large PDI at a low flow rate. When the flow rate was 6, the results were opposite, indicating that it was difficult to find a suitable flow rate for a small channel in order to prepare LNPs with a small size and good uniformity. D-B2, which had a normal flow channel, could result in LNPs with a small size and good uniformity at a flow rate of 1. It was inferred that D-B3 with a small flow channel was suitable for a lower flow rate, such as a flow rate of less than 1 mL/min. Notably, D-B6 could not result in LNPs with a particle size less than 100 nm even at a flow rate of 30 mL/min, indicating that when the flow channel was enlarged to a certain size, the double-layer structure lost the expected mixing effect.

Figure 15B:
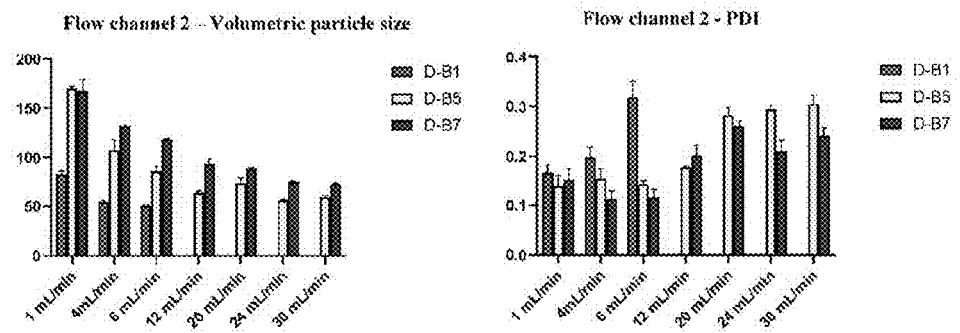
FIG. 15B shows histograms of the particle size (volumetric particle size) and PDI of particles obtained by sinuous microstructure mixing units D-B1, D-B5, and D-B7.

As could be seen from FIG. 15B, the flow channels of D-B1, D-B5, and D-B7 were in a continuously enlarged order, and the particle size of the prepared LNPs continuously decreased with the increase of the flow rate, which was basically consistent with the trend in FIG. 15A. However, at the same flow rate, the particle size was in the order of D-B1<D-B5<D-B7.

At 1 mL/min, the PDIs of the LNPs prepared by three chips were all very small. With the increase of the flow rate, the PDI from D-B1 continuously increased, which indicated that D-B1 was more suitable for use at the lower flow rate of 1 mL/min but not for use at the high flow rates among the test flow rates. For D-B5 and D-B7, PDI only increased when the flow rate was greater than 12 mL/min. By summarizing the particle size results, it could be seen that both D-B5 and D-B7 prepared LNPs with good uniformity at 12 mL/min and were suitable for use at larger flow rates than D-B1.

By summarizing the results of Examples 1 to 8, it could be derived that the various mixing units in Table 1 could result in an optimal flow rate range for particles with both acceptable DPI and particle size, specifically as shown in Table 3 below:

TABLE 3

Optimal flow rates of different mixing units

| No. | Suitable rate | Notes |
| --- | --- | --- |
| Y1 | About 6 mL/min | Medium flow rate |
| Y2 | About 12 mL/min to about 20 mL/min | High flow rate |
| T1 | About 6 mL/min | Medium flow rate |
| S1 | None | Reduced size, possibly leading to poor effects |
| S2 | None | Shorter Lc, possibly leading to poor effects |
| S3 | About 6 mL/min to about 24 mL/min | Medium to high flow rate |
| S4 | About 12 mL/min | High flow rate |
| D-A1 | None | The narrow flow path on the inner side, possibly leading to poor effects |
| D-B1 | About 1 mL/min to about 4 mL/min | Low flow rate |
| D-B2 | About 1 mL/min | Low flow rate |
| D-B2-3 | None | The number of semi-circular rings was relatively small, possibly leading to poor effects |

TABLE 3-continued

Optimal flow rates of different mixing units

| No. | Suitable rate | Notes |
|---|---|---|
| D-B2-5 | None | The number of semi-circular rings was relatively small, possibly leading to poor effects |
| D-B2-7 | About 1 mL/min | Low flow rate |
| D-B3 | None | Reduced size, possibly leading to poor effects at test flow rates |
| D-B4 | About 6 mL/min | Medium flow rate |
| D-B5 | About 4 mL/min to about 12 mL/min | Medium flow rate |
| D-B6 | About 4 mL/min to about 6 mL/min | Medium flow rate |
| D-B7 | About 4 mL/min | Medium flow rate |
| D-C1 | None | Staggered structure, possibly leading to poor effects at test flow rates |
| T-B1 | About 1 mL/min | Low flow rate |

Example 9. Observation of Mixing Effect with Colored Solutions

Figure 23A:
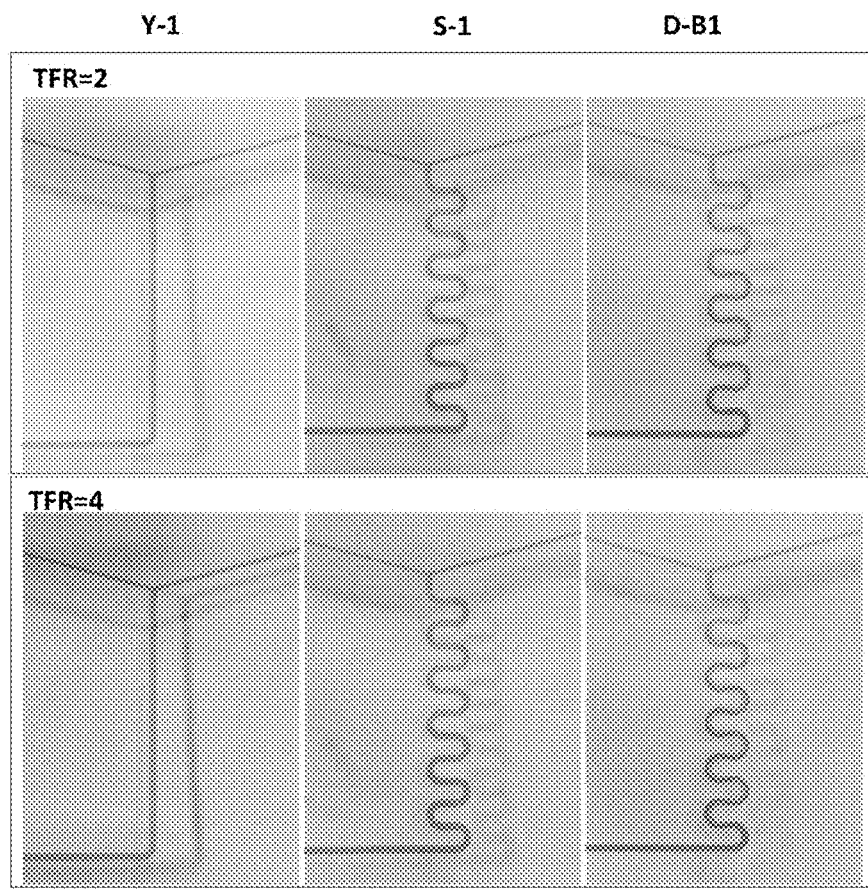
FIG. 23A shows photos of real objects, showing the mixing effects by the different colors of two fluids before mixing and the fluid after mixing, wherein an ethanol solution containing phenol red is mixed with a phosphate buffer solution containing trypan blue by using mixing units Y-1, S-1, and D-B1.
Figure 23B:
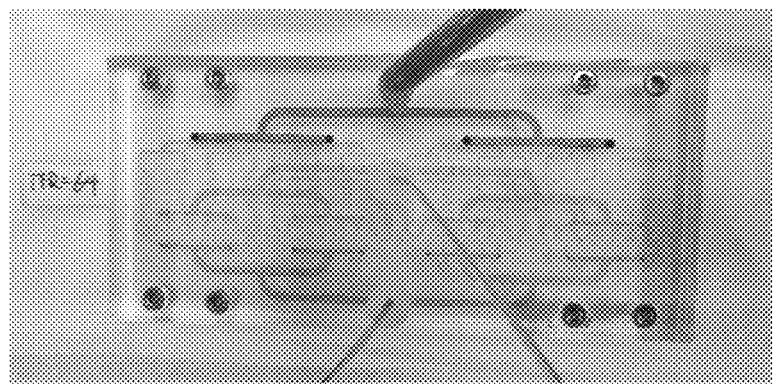
FIG. 23B shows a photo of real object and its mixing effects by different colors of two fluids before mixing, wherein an ethanol solution containing phenol red is mixed with a phosphate buffer solution containing trypan blue by using a 16-plex parallel mixing devices.

An ethanol solution containing phenol red and a phosphate buffer solution containing trypan blue were used to simulate the mixing process of an ethanol phase and an aqueous phase. The mixing effect was reflected by the different colors of the solutions before and after mixing. Before mixing, the ethanol phase was yellow and the aqueous phase was blue. After mixing, the liquid turned red, and the deeper the red color of the mixed liquid, the more thorough the mixing (as shown in FIG. 23A and FIG. 23B, the original picture was red, and the dark color represented the deeper red color).

Y1, the sinuous single-layer flow path S1, and the sinuous multi-layer flow path D-B1 of the present invention were compared. The results were as shown in FIG. 23A. In FIG. 23A, it could be seen that after passing through the mixing part with the same distance, the mixing effects of the three flow paths were judged according to the fluid color, wherein D-B1 was the best and Y1 was the worst. It could also be obvious from the figure that the two fluids in D-B1 were mixed together earlier, and a darker color appeared. It was also observed that in the flow path of the sinuous double-layer structure, the fluid flow was more stable and undisturbed, whereas in the sinuous single-layer flow path, more disturbances appeared.

This experiment indicated the superiority and stability of the double-layer SML flow path of the present invention in terms of mixing effect.

Example 10. Mixing Device Having Multiple Parallel Sinuous Multi-Layer Mixing Units 4-plex parallel sinuous multi-layer microstructure mixing units as shown in FIG. 3A-FIG. 3E and 16-plex parallel sinuous multi-layer microstructure mixing units as shown in FIG. 4A-FIG. 4D were prepared. The colored solutions in Example 9 were used to reflect the mixing effect.

As shown in FIG. 23B, the mixed fluid in the outlet flow path of the 16-SML mixing device turned into a darker color (it was red in the original photo), indicating that the two fluids input were fully mixed.

Example 11. Comparison with a Non-Sinuous Flow Path Chip

Figure 21A:
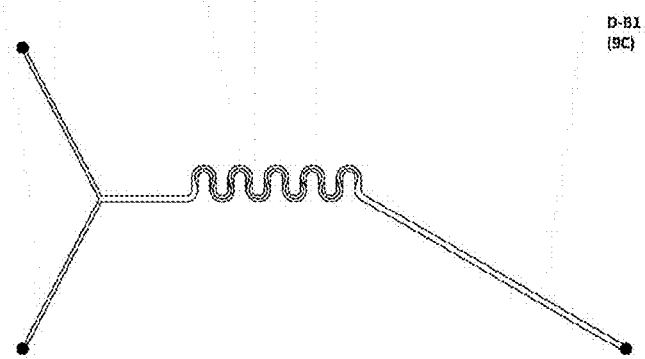
FIG. 21A is a schematic structural view of the mixing unit of the present invention in Example 10.
Figure 21B:
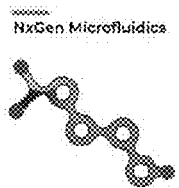
FIG. 21B is a schematic structural view of an annular mixing unit in the prior art (B).

In this example, the size and design of the mixing unit numbered D-B1 in Table 1 were used to prepare a microfluidic chip. The only difference was that nine semi-circular rings were used, so it was referred to as D-B1 (9C). A non-sinuous flow path chip in the prior art was used for comparison, and NxGen microfluidic chip (Precision NanoSystems co., Canada) matched with Model Ignite microfluidic device was specifically used. The chip had a flow path composed of four annuli, as disclosed in the aforementioned CN 108778477 A. The structures of the two types of mixing units were shown in FIG. 21A and FIG. 21B. As shown in FIG. 21B, the mixing unit of the NxGen microfluidic chip had a plurality of consecutive annular structures in the mixing part, including more flow path branches.

In order to test the effect of the microfluidic chip of the present invention compared with the prior art, the various flow paths described in the following table were used to prepare LNP samples loaded with GFP mRNAs by mixing. Specifically, an aqueous solution of GFP mRNAs (citric acid buffer solution, pH=4) and an ethanol phase (a lipid working solution) were mixed at a volume ratio of 3:1 at different flow rates to prepare an LNP sample.

For the ethanol phase, ethanol stock solutions of SM-102, DSPC (distearoylphosphatidylcholine), cholesterol, and DMG-PEG (distearoylphosphatidylethanolamine-polyethylene glycol) were respectively prepared according to the concentrations shown in Table 4 and were uniformly mixed at a certain volume ratio to obtain a lipid material working solution as the ethanol phase. The concentrations and molar ratios of the various components in the lipid material working solution were shown in Table 4. Similarly, an aqueous solution of 0.1 mg/mL GFP mRNAs (citric acid buffer solution, pH=4) was prepared according to the concentration shown in Table 4. The prepared ethanol phase and aqueous phase were injected into the mixer D-B1(9C) or the NxGen microfluidic chip at a volume ratio of 1:3 (100 μL:300 μL).

TABLE 4 mGFP LNP formula

| | Concentration, mg/mL | Volume, μL |
|---|---|---|
| SM-102 | 3 | 100 |
| DSPC | 0.75 | |
| Cholesterol | 1.4 | |
| DMG-PEG | 0.4 | |
| GFP mRNAs (citric acid buffer solution, pH = 4) | 0.1 | 300 |

Various flow rates were tried. Specifically, for the two chips, the total flow rates of 1 mL/min, 2 mL/min, 4 mL/min, and 12 mL/min were tried. The statistical results of the particle size and PDI of the LNP sample loaded with GFP mRNAs were shown in FIG. 22.

Figure 22:
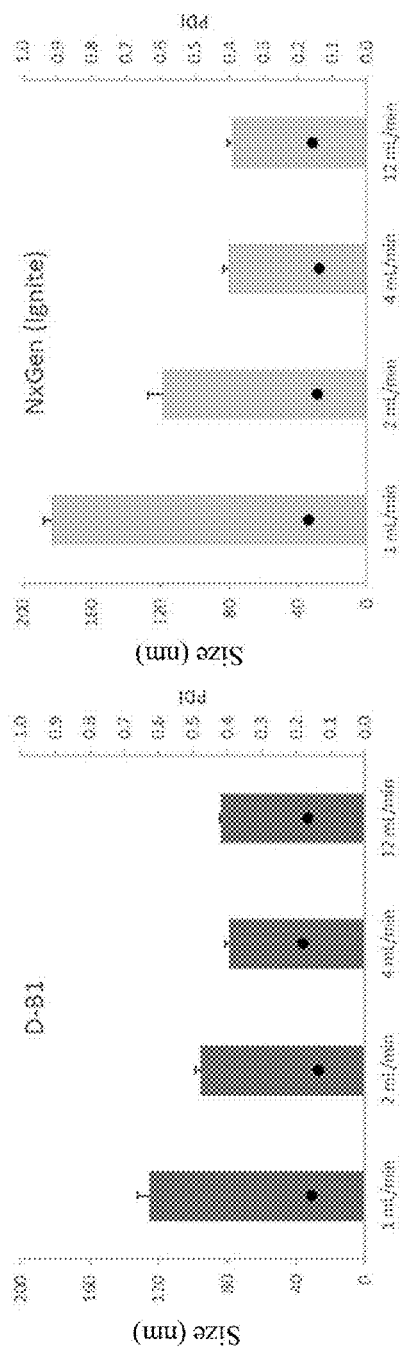
FIG. 22 shows the size and DPI measurement results of self-assembled LNPs loaded with RNAs, which are prepared by the mixing unit of the present invention in Example 10 and the annular mixing unit in the prior art.

As could be seen from FIG. 22, both chips showed a trend of the particle size to decrease with the increase of the flow rate. At the flow rates of 4 mL/min and 12 mL/min, the particle sizes of the LNPs prepared by the two chips were both about 80 nm. At 1 mL/min and 2 mL/min, the particle size of the LNPs obtained by the D-B1(9C) chip was smaller than that of the LNPs obtained by the NxGen microfluidic chip. Moreover, the PDIs of the LNPs prepared by the two chips were both controlled to be not more than 0.2 at all the test flow rates. The results indicated that compared with the prior art, the microstructure mixing unit of the present invention could result in nanoparticles with a smaller particle size at a lower flow rate.

The invention claimed is:

1. A sinuous multi-layer (SML) microstructure mixing unit, comprising an inlet part, a confluence part, a multi-layer mixing part, and an outlet part in fluid communication, wherein
    each layer in the multi-layer mixing part is a sinuous flow path, and the sinuous flow path of each layer comprises n number of semi-circular rings or semi-elliptical rings, and any two adjacent semi-circular rings or semi-elliptical rings have opposite bending directions and are connected to each other via a straight flow path;
    projection shapes of two adjacent layers in the multi-layer mixing part always at least partially but not completely coincide throughout the flow path of the mixing part; and
    the inlet part comprises at least two inlets, and the inlets are in fluid communication with the confluence part, so that different fluids flowing in from the inlets converge at the confluence part.

2. The SML microstructure mixing unit according to claim 1, wherein the mixing part comprises 2, 3, 4, or 5 layers of the sinuous flow paths.

3. The SML microstructure mixing unit according to claim 1, wherein each layer of sinuous flow path has a fixed width, and the widths of these layers of sinuous flow paths can be the same or different from each other; preferably, at least two layers of sinuous flow paths have different widths.

4. The SML microstructure mixing unit according to claim 1, wherein these layers of flow paths are always parallel in the semi-circular ring or semi-elliptical ring part of the mixing part.

5. The SML microstructure mixing unit according to claim 4, wherein outer edges of these layers of flow paths always coincide in the semi-circular ring or semi-elliptical ring part of the mixing part.

6. The SML microstructure mixing unit according to claim 1, wherein (a) the mixing part comprises two layers of sinuous flow paths, and cross sections of the sinuous flow paths are L-shaped in the semi-circular ring or semi-elliptical ring part; or (b) the mixing part comprises three layers of sinuous flow paths, and cross sections of the sinuous flow paths are in a T shape rotated by 90° in the semi-circular ring or semi-elliptical ring part.

7. The microstructure mixing unit according to claim 1, wherein an outer diameter Do of each semi-circular ring or an outer axial length Do of each elliptical ring in the extension direction of the sinuous form in each layer of sinuous flow path is 3 to 5 times the width of the flow channel; and/or an inner diameter Di of each semi-circular ring or an inner axial length Di of each elliptical ring in the extension direction of the sinuous form is 1 to 3 times the width of the flow channel.

8. The microstructure mixing unit according to claim 1, wherein each pair of semi-circular rings or semi-elliptical rings with opposite bending directions are preferably connected by a length of straight flow path, and the length Lc of the straight flow path is 0.5 W to 4 W, preferably 1 W to 3 W, more preferably 1 W to 2 W.

9. The microstructure mixing unit according to claim 1, wherein n is an integer greater than or equal to 6, preferably any integer from 7 to 15.

10. The microstructure mixing unit according to claim 1, wherein the microstructure mixing unit comprises two or three layers of the sinuous flow paths, each layer of sinuous flow path comprises 6 to 10 semi-circular rings, and the length Lc of the straight flow path between semi-circular ring flow paths is greater than or equal to the inner diameter Di of a projection shape of the semi-circular ring flow path.

11. The microstructure mixing unit according to claim 1, wherein at least two layers of the sinuous flow paths have different widths, and the width of a narrower layer is between 25% and 75%, preferably about 50% of the width of a wider layer.

12. A microstructure mixing device comprising m number of the microstructure mixing unit according to claim 1, wherein the m number of microstructure mixing units are in fluid communication via an inlet part, a confluence part and/or an outlet part, wherein m is an integer greater than 1.

13. The microstructure mixing device according to claim 12, wherein m is an even number, and preferably, m is 2 to the power of an integer.

14. A method for preparing nanoparticles by self-assembly, comprising mixing a first fluid with a second fluid by means of the microstructure mixing unit according to claim 1, wherein the first fluid is allowed to flow into a first inlet, and the second fluid is allowed to flow into a second inlet; and the first fluid is a fluid containing a nanoparticle vehicle material, and the second fluid is a fluid containing a nanoparticle load.

* * * * *